(12) United States Patent
Tanaka et al.

(10) Patent No.: US 8,525,952 B2
(45) Date of Patent: Sep. 3, 2013

(54) LIQUID CRYSTAL DISPLAY DEVICE

(75) Inventors: Toshiaki Tanaka, Tokyo (JP); Hiroki Kaneko, Hitachinaka (JP); Ikuo Hiyama, Hitachinaka (JP)

(73) Assignees: Hitachi Displays, Ltd., Chiba-Ken (JP); Panasonic Liquid Crystal Display Co., Ltd., Hyogo-Ken (JP)

(*) Notice: Subject to any disclaimer, the term of this patent is extended or adjusted under 35 U.S.C. 154(b) by 444 days.

(21) Appl. No.: 12/103,742

(22) Filed: Apr. 16, 2008

(65) Prior Publication Data

US 2008/0259252 A1 Oct. 23, 2008

(30) Foreign Application Priority Data

Apr. 20, 2007 (JP) ................................. 2007-111148

(51) Int. Cl.
*G02F 1/1335* (2006.01)
*F21V 9/00* (2006.01)
*F21S 4/00* (2006.01)
*F21V 21/00* (2006.01)

(52) U.S. Cl.
USPC .......................... 349/69; 362/231; 362/249.02

(58) Field of Classification Search
USPC .......................................................... 349/69
See application file for complete search history.

(56) References Cited

U.S. PATENT DOCUMENTS

| | | | | |
|---|---|---|---|---|
| 6,069,676 A | * | 5/2000 | Yuyama .......................... 349/62 |
| 7,276,861 B1 | * | 10/2007 | Shteynberg et al. .......... 315/291 |
| 8,035,603 B2 | * | 10/2011 | Furukawa et al. ............. 345/102 |
| 2005/0001562 A1 | * | 1/2005 | Pederson ....................... 315/291 |
| 2005/0268839 A1 | * | 12/2005 | Araki et al. ................... 116/288 |
| 2005/0286010 A1 | * | 12/2005 | Park et al. ..................... 349/199 |
| 2006/0012988 A1 | * | 1/2006 | Hsieh et al. ................... 362/231 |
| 2006/0208669 A1 | * | 9/2006 | Huynh et al. ................. 315/312 |
| 2006/0221637 A1 | | 10/2006 | Chikugawa et al. |
| 2006/0250339 A1 | * | 11/2006 | Kim ................................ 345/87 |
| 2008/0002100 A1 | * | 1/2008 | Kaneko et al. .................. 349/65 |
| 2008/0024696 A1 | | 1/2008 | Arai et al. |
| 2008/0089064 A1 | * | 4/2008 | Wang ............................ 362/249 |

FOREIGN PATENT DOCUMENTS

| | | |
|---|---|---|
| JP | 09-166619 | 6/1997 |
| JP | U3104504 | 2/2004 |
| JP | 2004-235046 | 8/2004 |
| JP | 2005-219540 | 8/2005 |
| JP | 2006-107823 | 4/2006 |
| JP | 2006-133721 | 5/2006 |
| JP | 2006-286935 | 10/2006 |
| JP | 2006-344919 | 12/2006 |
| JP | 2007-004995 | 1/2007 |
| JP | 2007-080877 | 3/2007 |

* cited by examiner

*Primary Examiner* — Edward Glick
*Assistant Examiner* — Dennis Y Kim
(74) *Attorney, Agent, or Firm* — Antonelli, Terry, Stout & Kraus, LLP.

(57) ABSTRACT

An illumination device includes a light source module, the module comprising: a substrate; a plurality of wiring lines provided on the substrate; and a plurality of LED devices implemented in the wiring lines: wherein the plurality of LED devices include a plurality of red LED devices, a plurality of green LED devices, and a plurality of blue LED devices: wherein the plurality of wiring lines include a wiring line having the plurality of red LED devices implemented in series, a wiring line having the plurality of green LED devices implemented in series, and a wiring line having the plurality of blue LED devices implemented in series; and wherein the plurality of wiring lines are connected in parallel and driven by a single power voltage.

20 Claims, 26 Drawing Sheets

LIQUID CRYSTAL DISPLAY DEVICE

BACKGROUND OF THE INVENTION

1. Field of the Invention

The present invention relates to a light source module having light emitting diode devices mounted thereon and a liquid crystal display device for which they are applied as a backlight.

2. Description of the Related Art

Although light emitting diode devices (LED device) are mounted on a liquid crystal display device at present, the configuration of a light source module as an illumination device has not yet been sufficiently optimized. A light source for a large scale sized liquid crystal display television has a problem in view of low power consumption and low cost which will be required for them, and accordingly techniques for device operation and module drive have not reached the technical level of products.

The configuration of a light source module having LED devices mounted thereon enables planar-split area control that has not been realized with the conventional CCFL technique. In planar-split area control, how LED devices are arranged on a wiring substrate and how they are driven are the keys. However, a high application voltage is still required for devices on a single wiring substrate, and each device wiring line requires a different application voltage.

JP-A-2006-133721 discloses a technique for performing white mixing in unit of seven LED devices mounted on a package and driven based on this configuration unit in a light source module, a backlight unit, and a liquid crystal display device. Specifically, JP-A-2006-133721 discloses an example using a 7×4 or 7×8 array based on the configuration unit of seven LED devices.

Further, JP-A-2006-286935 discloses a device configuration and line drive in a package and array configuration using a LED light source. Specifically, JP-A-2006-286935 mainly discloses a substrate configuration of line connections including LED devices arranged in a row or a plurality of rows at predetermined intervals, wherein each LED device having two or more peak wavelengths is mounted.

SUMMARY OF THE INVENTION

JP-A-2006-133721 and JP-A-2006-286935 describe device arrangements and two-wavelength device configuration in order to obtain white light mixing and optical uniformity, and drive operations as line connection or separate substrate connection. However, JP-A-2006-133721 and JP-A-2006-286935 do not specifically mention specifications and drive conditions to be applied to a drive power supply. Further, a specific configuration for driving each LED device with a single power voltage is not discussed.

When a light source is to be configured by implementing each of red (hereafter referred to as "R"), green (hereafter referred to as "G"), and blue (hereafter referred to as "B") LED devices, if each LED device can be driven by a single power voltage, simple operational response and easy voltage control can be achieved.

The present invention is based on the above-mentioned problem. An object of the present invention is to provide a LED light source that can be driven by a single power voltage and a liquid crystal display device using the light source. Further, another object of the present invention is to disclose details of a design technique based on a configuration and materials of resistance wiring in relation to drive control with a constant power voltage, and to disclose a specific configuration about current control in steady state and current and light intensity compensation for temperature change through control of resistance wiring.

In order to solve the above-mentioned problem, the present invention is configured as shown below.

An illumination device according to the present invention includes a light source module comprising a substrate; wiring lines provided on the substrate; and a plurality of LED devices implemented in the wiring lines. The plurality of LED devices are connected in series and driven by a single power voltage. Even if each of the LED devices operates on a different voltage, it is possible to operate them with the same single power voltage as above by connecting the plurality of LED devices in series. Wire lines each of which is connected to a plurality of LED devices having different operating voltages are driven in parallel, whereby it is possible to configure a light source module having wiring connections for a plurality of LED devices driven by the same single power voltage.

Further, the illumination device according to the above-mentioned configuration includes a plurality of LED devices composed of Red (R), Green(G), and Blue (B) devices, each being implemented in each of independent R, G, and B wiring lines, respectively; wherein the R-LED, G-LED, and B-LED devices in respective independent wiring line are driven in parallel by a single power voltage V0; and wherein the light source module can independently control each of the R, G, and B devices, and the R, G, and B light sources are mixed to form a white light source.

Further, an illumination device according to the present invention includes a light source module comprising a plurality of LED devices implemented in wiring lines; wherein the plurality of LED devices in respective independent R, G, and B wiring lines are driven in parallel by a single power voltage V0. Specifically, the light source module includes wiring connections of the plurality of R-, G-, and B-LED devices which are driven under the following conditions: when the numbers of G- and B-LED devices are n(G) and n(B), respectively, and the operating voltage of G- and B-LED devices are V(G) and V(B), respectively, there is a relation of $n(G) \cdot V(G) = n(B) \cdot V(B)$; when the number of R-LED devices is n(R) and the operating voltage of an R-LED device is V(R), there is a relation of $n(G) = n(B) < n(R)$ when $n(R) = n(G) \cdot V(G)/V(R) = n(B) \cdot V(B)/V(R)$; and $n(G) \cdot V(G) = n(B) \cdot V(B) = n(R) \cdot V(R) = V(0)$ (constant voltage).

Further, the illumination device according to the present invention includes the plurality of LED devices composed of Red (R), Green (G), and Blue (B) devices, each being implemented in each of independent R, G, and B wiring lines. The R-, G-, and B-LED devices are composed of two or more LED devices having different wavelengths. The R-LED, G-LED, and B-LED devices in respective independent wiring line are driven in parallel by a single power voltage. The light source module can independently control each of the R, G, and B devices, or the R, G, and B light sources are mixed to form a white light source.

Further, the illumination device according to the present invention includes the plurality of LED devices composed of Red (R), Green (G), and Blue (B) devices, each being implemented in each of independent R, G, and B wiring lines; wherein the R-LED, G-LED, and B-LED devices in respective independent wiring line are driven in parallel by a single power voltage; wherein an interval that can be controlled with a single voltage is configured as a unit of wiring substrate, a wiring substrate with the unit configuration is configured as a unit, or a plurality of wiring substrates with the unit configuration are arranged to cope with planar-split area control; and wherein the light source module can independently control the luminance and chromaticity and each of the R, G, and B devices, or the R, G, and B light sources are mixed to form a white light source.

Further, a liquid crystal display device according to the present invention includes a plurality of white LED devices, i.e., a white light source composed of blue LED devices and photoexcited fluorescent paste, and is driven by a single power voltage mounted thereon; wherein a plurality of wiring substrates are arranged to cope with planar-split area control; and wherein the light source module can independently control the luminance and chromaticity and each of the R, G, and B devices.

Further, a liquid crystal display device according to the present invention uses the above-mentioned illumination device as a backlight source of the liquid crystal display.

When a LED light source and a liquid crystal display device using the light source according to the present invention are implemented, it becomes possible to perform simple operational response and voltage control.

BRIEF DESCRIPTION OF THE DRAWINGS

Other objects and advantages of the invention will become apparent from the following description of embodiments with reference to the accompanying drawings in which.

DETAILED DESCRIPTION OF THE PREFERRED EMBODIMENTS

Figure 1:
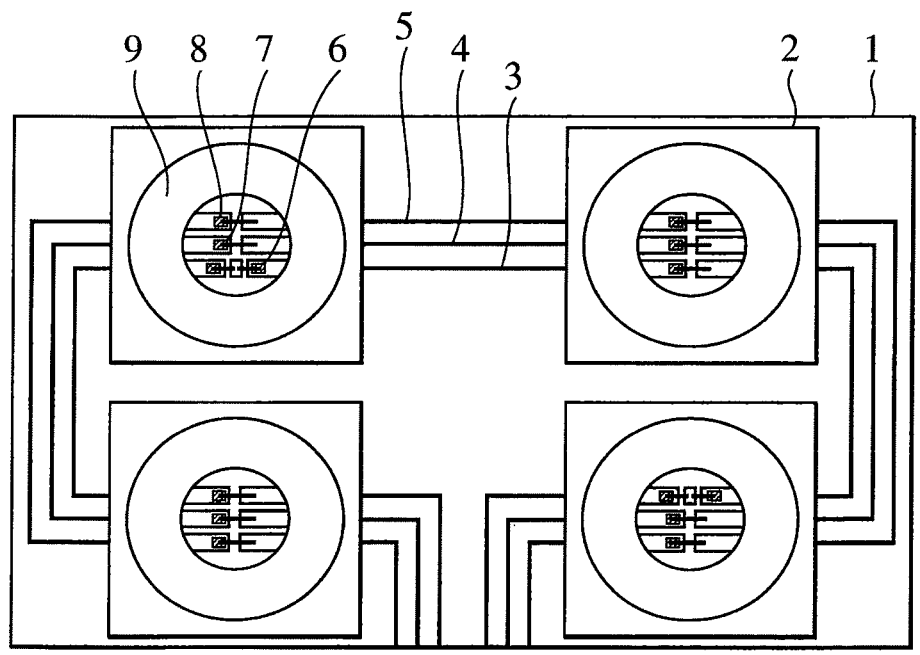
FIG. 1 is a top view showing a wiring connection mounting each of LED devices according to the present invention.
Figure 2:
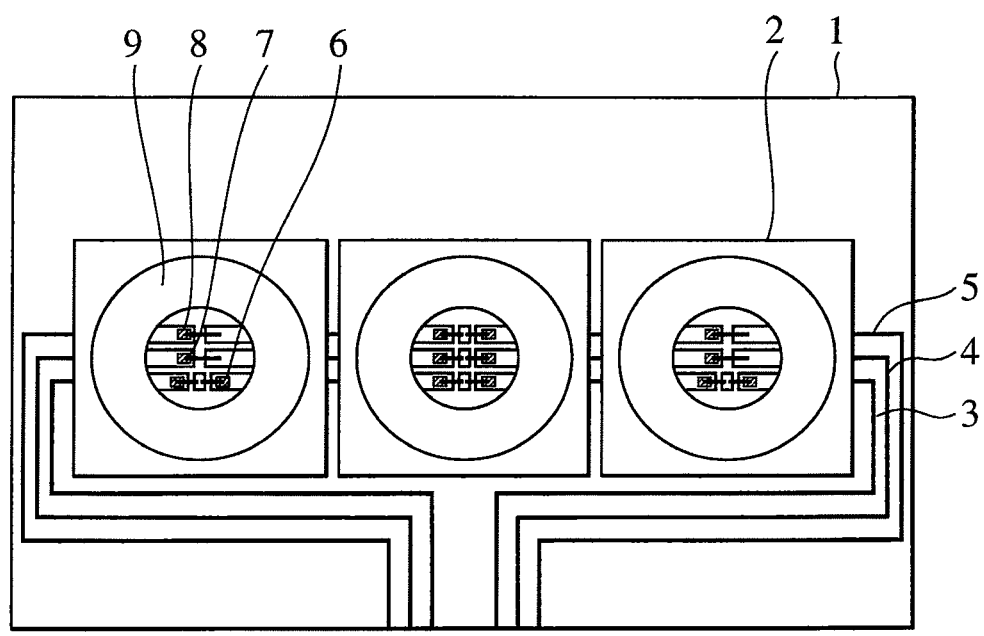
FIG. 2 is a top view showing a wiring connection mounting each of LED devices according to the present invention.
Figure 3:
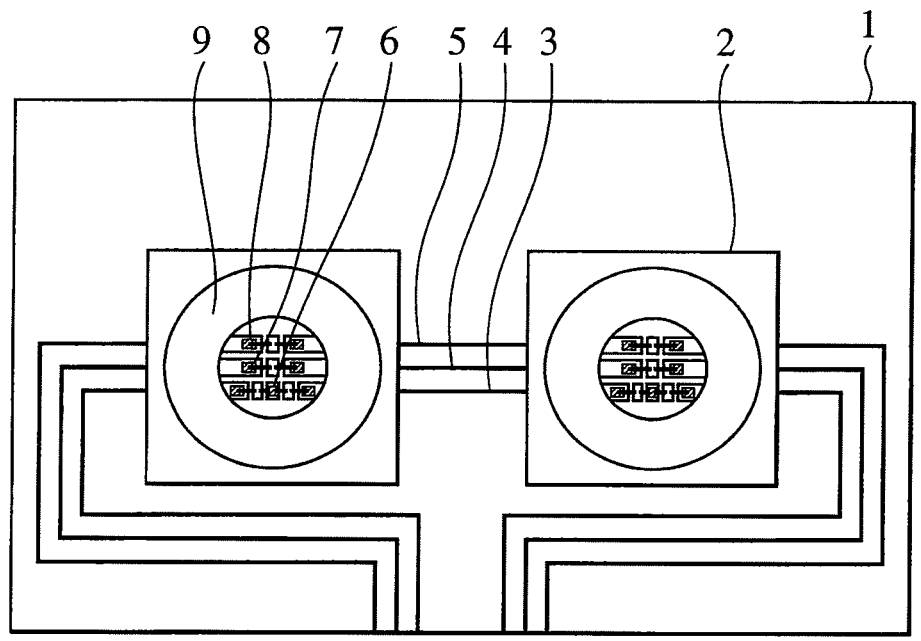
FIG. 3 is a top view showing a wiring connection mounting each of LED devices according to the present invention.
Figure 4:
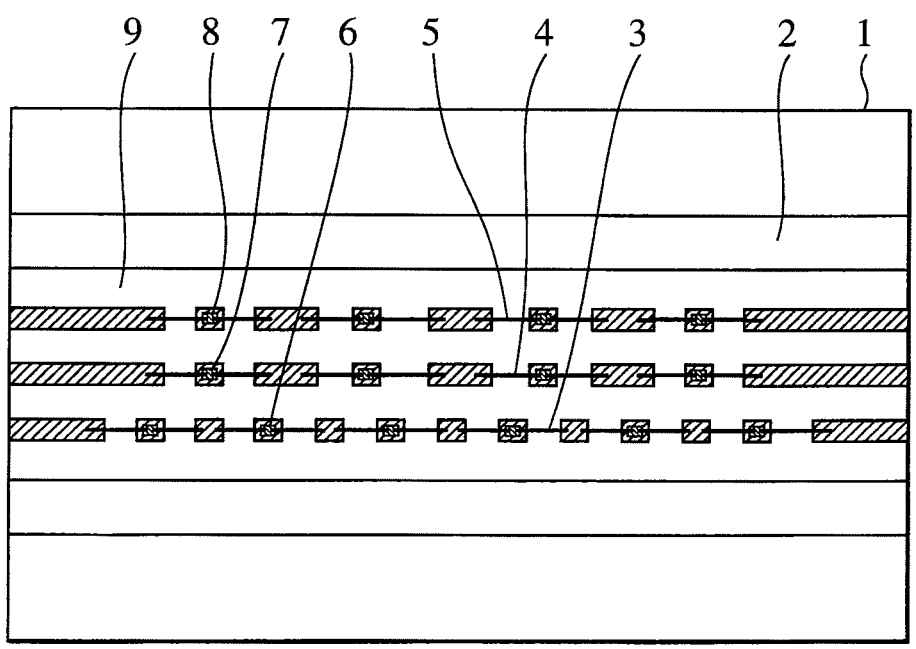
FIG. 4 is a top view showing a wiring connection mounting each of LED devices according to the present invention.

The following describes the configuration of a light source module for an illumination device or a liquid crystal display device, according to the present invention, the light source module being driven by a constant power voltage and capable of controlling the current and light intensity and compensating temperature change.

Specific forms for carrying out the present invention will be explained below.

First Embodiment

A first embodiment of the present invention will be explained below with reference to FIGS. 1 to 12.

With the first embodiment, a plurality of R-, G-, and B-LED devices are mounted on a wiring substrate, and a constant power voltage is applied to the R-, G-, and B-LED device wiring lines.

With arrangements of FIGS. 1 to 4, a reflector 2 is provided on a metal substrate with an insulating layer or a ceramic substrate 1. R-LED devices 6 (having a peak in a wavelength region from 610 nm to 640 nm), G-LED devices 7 (having a peak in a wavelength region from 510 nm to 540 nm), and B-LED devices 8 (having a peak in a wavelength region from 445 nm to 475 nm) are mounted in a R-LED device wiring line 3, a G-LED device wiring line 4, and a B-LED device wiring line 5, respectively, and sealed in a package by use of transparent resin 9. In this example, six R-LED devices, four G-LED devices, and four B-LED devices are respectively mounted in the R, G, and B wiring lines.

The present embodiment makes it possible to provide not only a normal light source module but also a light source module suitable as a backlight of a liquid crystal display device. Conventionally, a LED device used for a light source module is as small in size as about 0.3 mm on a side. In accordance with the present embodiment, however, if the device size is increased to sufficiently increase the luminous efficiency, a light intensity suitable for the backlight of the liquid crystal display device is obtained, which allows operation with low resistance and low power consumption. More specifically, a current sufficient for a certain constant-voltage operation flows for each of the R-, G-, and B-LED devices, making it possible to obtain a sufficient light intensity and control each device by means of the applied current. Each device is desirably larger than 0.3 mm and smaller than 1.0 mm in size, and it is required to determine an optimal size depending on current-voltage characteristics, light intensity, and efficiency.

As shown in FIGS. 1 to 4, when R-, G-, and B-LED devices are arranged so that the ratio of the number thereof is 6:4:4, respectively, it becomes possible to drive each wiring line having each of the R, G, and B devices connected in series with a single power voltage.

Figure 5A:
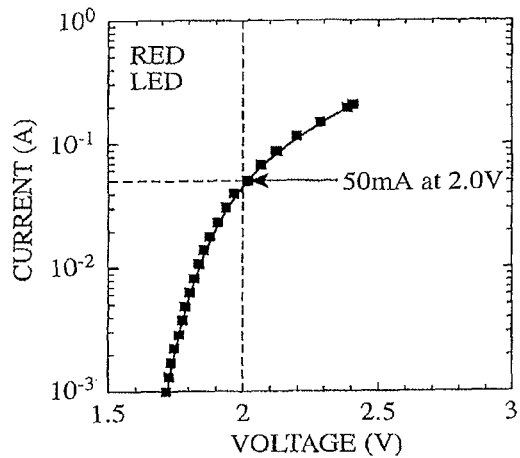
FIGS. 5A, 5B, and 5C are diagrams showing an example of current-voltage characteristics in R-, G-, and B-LED devices, respectively, according to the present invention.
Figure 5B:
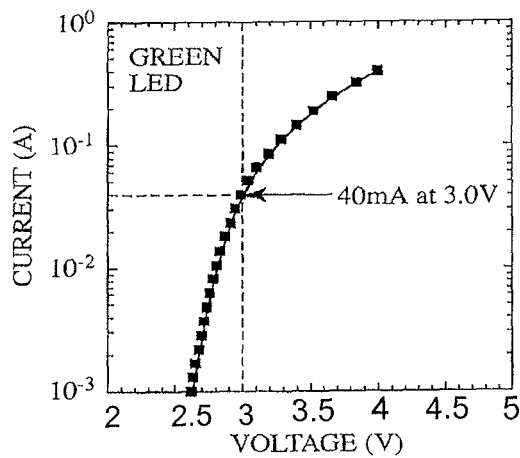
Figure 5C:
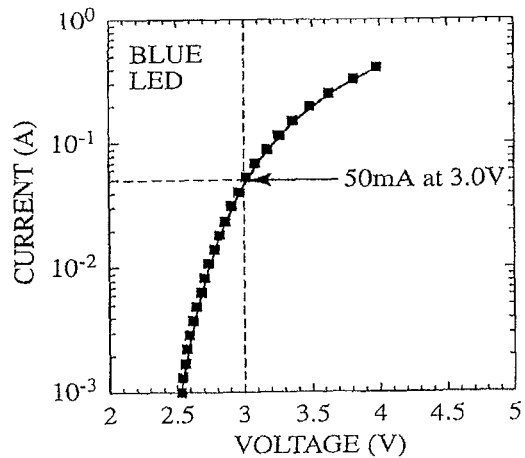

FIGS. 5A, 5B, and 5C show current-voltage characteristics of R-, G-, and B-LED devices, respectively. With a R-LED device, a 40 mA current is obtained with a 2V voltage, with a G-LED device, a 40 mA current is obtained with a 3V voltage; with a B-LED device, a 50 mA current with a 3V voltage. In this manner, since the ratio of voltage values necessary to obtain a sufficient current as a backlight source can be approximated to 2:3:3 (R:G:B), each wire line can be driven by a single power voltage based on the above-mentioned configuration. Further, in accordance with the configurations of FIGS. 1 to 4, six R-LED devices, four G-LED devices, and four B-LED devices are arranged and therefore a 12V power supply is used to obtain a sufficient light source as a backlight. Accordingly, a 12V power voltage for driving a control signal timing controller TCON circuit mounted on a liquid crystal display device can be used together to drive the backlight source. Configuring each wiring line by use of twice the respective number of LED devices above allows the use of 24V power supply. The 24V power supply mounted on a liquid crystal display device can also be used together as a power supply for the backlight.

More generally speaking, LED devices for a light source module are composed of n(R) R-LED devices, n(G) G-LED devices, and n(B) B-LED devices. When the operating voltage of respective LED devices is V(R), V(G), and V(B), there is a relation of n(R)≧n(G)=n(B) or n(R)×V(R)=n(G)×V(G)=n(B)×V(B). Here, the number ratio n(R):n(G):n(B) is 3:2:2. Therefore, a minimum power voltage for driving devices in relation to n(R)×V(R)=n(G)×V(G)=n(B)×V(B) is 6V, and a voltage for driving a light source module mounting R-, G-, and B-LED devices is 6 mV (m is an integer) which is an integral multiple of 6V.

A power supply mounted on a liquid crystal display device and an on-board rechargeable battery can use a 12V or 24V power voltage, which is applied under the above-mentioned drive voltage condition.

Figure 6:
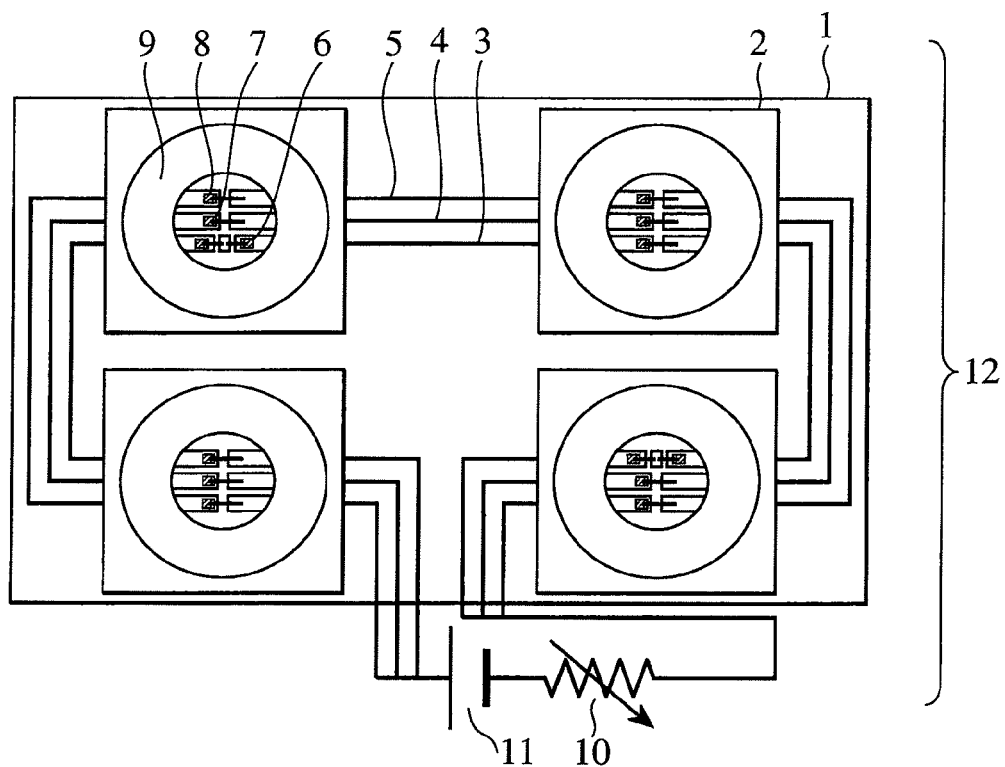
FIG. 6 is a top view of the configuration of a wiring substrate unit, driven by a constant-voltage power supply and subjected to resistance adjustment, according to the present invention.

Then, in a wiring substrate unit, a difference occurs in current-voltage characteristics of R-, G-, and B-LED devices resulting in characteristic variation and, therefore, it is necessary that the LED devices can be driven by a constant power voltage. Referring to FIG. 6, it is possible to adjust the resistance of the entire wiring according to a power supply 11 by introducing a variable resistor 10 in the wiring lines. Alternatively, it is possible to control the operating voltage based on more precise resistance by introducing the variable resistor 10 in each of the R, G, and B wiring lines. In this example, the wiring substrate unit operates on a 12V power voltage.

Further, a wiring substrate unit controlled to a constant power voltage with a variable resistance is used to perform planar-split area control to drive the backlight of the liquid crystal display device.

Figure 7:
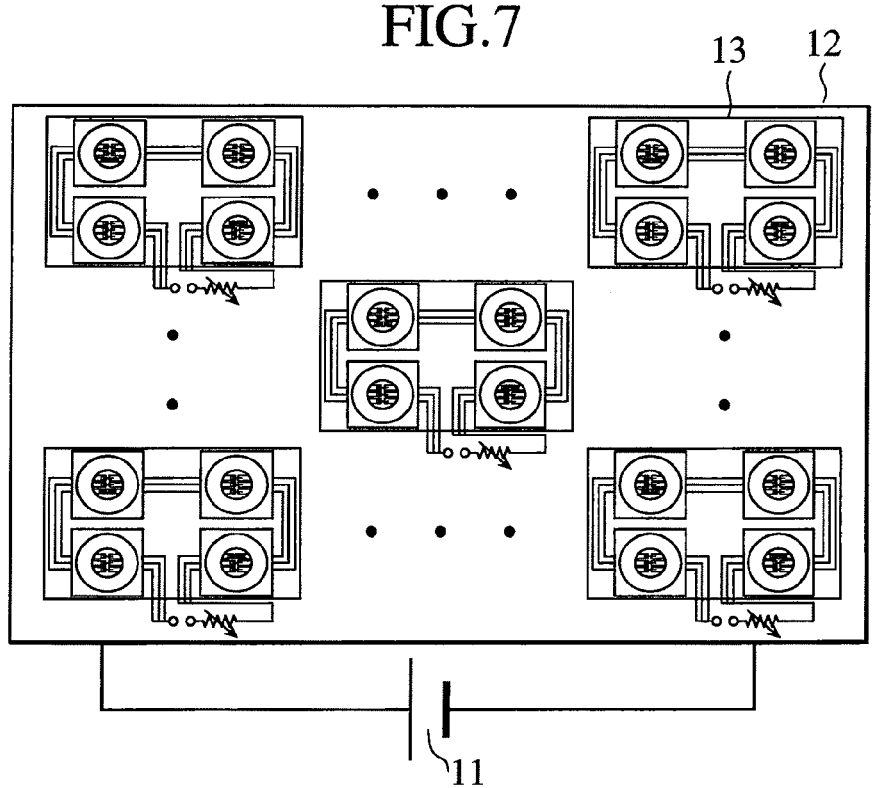
FIG. 7 is a top view showing the backlight configuration with planar-split area control, driven by a constant-voltage power supply, according to the present invention.

FIG. 7 is a general view of a LED light source according to the present embodiment.

A stand for backlight module 12 mounts a plurality of light source module units 13 according to the present embodiment to configure a backlight module enabling planar-split area control. With a large scale sized liquid crystal display device, the larger the size, the more effective becomes the planar-split area control. Further, low-power operation for each scene becomes possible through operation on a planar-splitting basis for each motion picture scene. In the case of a large scale sized liquid crystal display television having a wiring substrate unit configuration in which 8×8 planar-split area control is applied, for example, with a 32' display size, the luminous efficiency and power characteristics of each of the above-mentioned R-, G-, and B-LED devices mean that the backlight of the liquid crystal display can be driven by electric power lower than power consumption 100 W and that images can be provided with lower electric power for each motion picture scene based on this operating condition.

In accordance with the present embodiment, since each LED device can be driven by a single power voltage, it naturally becomes possible to drive the plurality of light source module units 13 of FIG. 7 with a single power voltage. Referring to FIG. 7, therefore, it may be possible to arrange a power supply for each of the light source module units 13; however, these power supplies can be configured in parallel as a single power supply. Further, since each of the R, G, and B wiring lines operates on 12V in each wiring substrate unit, it is possible to use the same power voltage as the 12V power supply which drives the control signal timing controller TCON circuit mounted on the liquid crystal display device. That is, it is possible to drive the wiring substrate units in parallel on 12V according to the power voltage built in the liquid crystal display device. As a result, since an external specific power voltage becomes unnecessary, it is possible to provide an illumination device which simultaneously attains simple operational response and easy voltage control with a single power supply.

The overall configuration of a liquid crystal display device using the above-mentioned LED light source module will be explained below.

Figure 8:
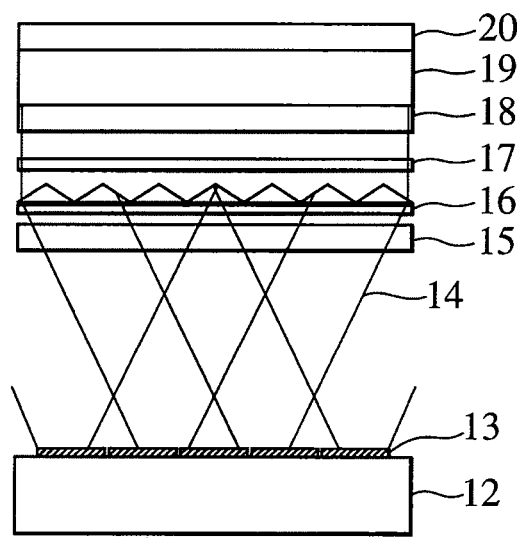
FIG. 8 is sectional view showing the configuration of a stand for backlight mounting a wiring substrate unit and an optical system according to the present invention.

FIG. 8 is a sectional view showing the configuration of a large scale sized liquid crystal display device mounting LED devices according to the present embodiment. A module for mounting each of the light source module units 13 is configured on the stand for backlight module 12. A backlighting ray 14 emitted from a package of each light source module unit 13 penetrates a diffusion plate 15, a prism sheet 16, a diffusion film 17, a lower polarizer plate 18, a TFT circuit and color filter and liquid crystal display panel 19, and an upper polarizer plate 20, and illuminates the liquid crystal display panel display device.

Figure 9:
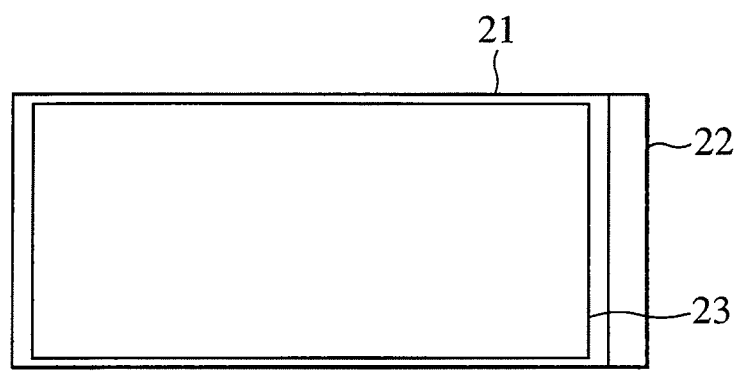
FIG. 9 is a top view of a large scale sized liquid crystal display panel display device using the LED device backlight module according to the present invention.
Figure 10:
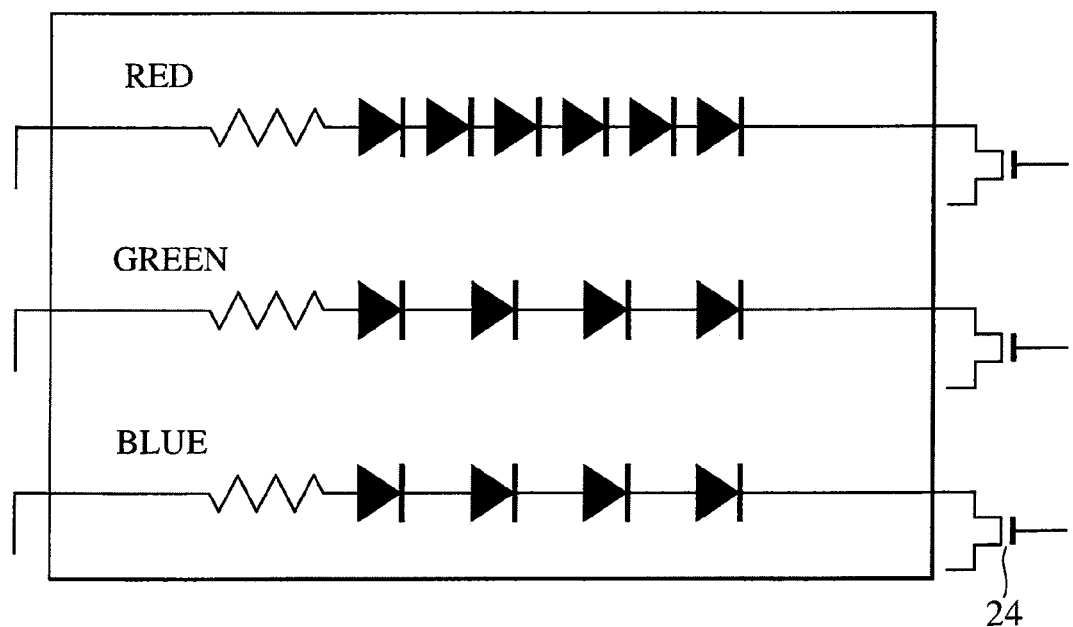
FIG. 10 is a top view showing the circuit configuration mounted on a wiring substrate unit according to the present invention.
Figure 11:
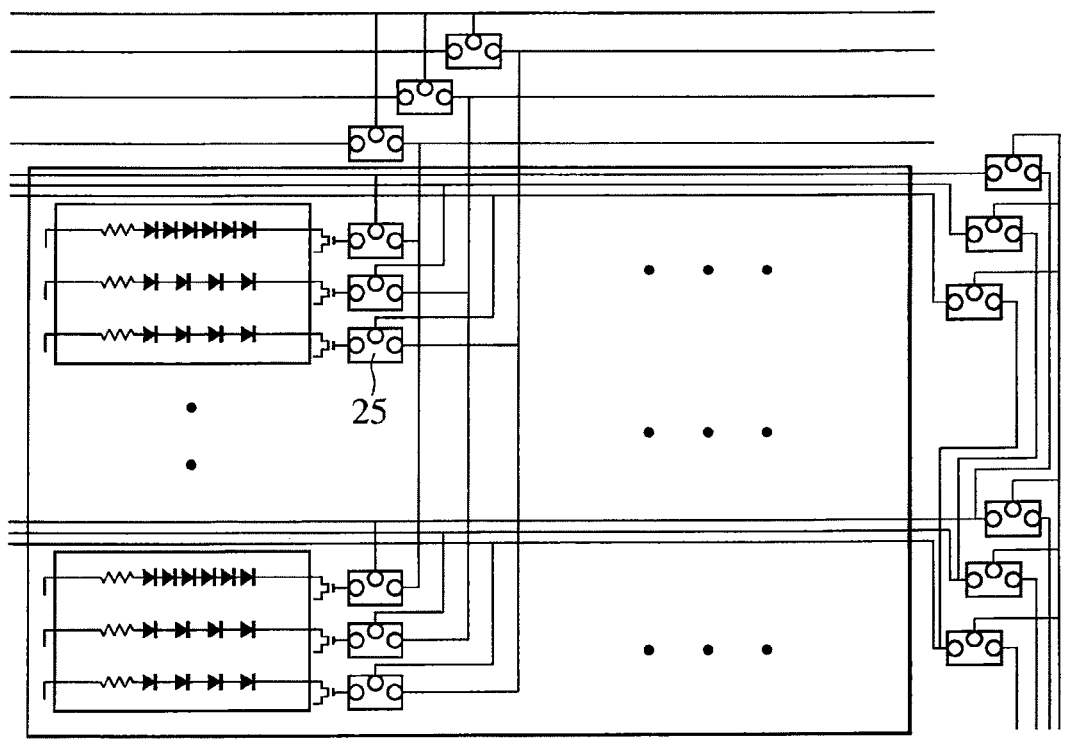
FIG. 11 is a top view showing the circuit configuration with planar-split area control, driven by a constant-voltage power supply, according to the present invention.

A backlight module constituting the liquid crystal display panel display device according to the present embodiment incorporates the above-mentioned configuration of the R-, G-, and B-LED devices and the configuration of the wiring substrate unit. FIG. 9 is a top view of a large scale sized liquid crystal panel display device applicable to a large scale liquid crystal display television, the liquid crystal panel display being composed of a stand for backlight 21, a driver circuit 22, and a large scale sized liquid crystal panel 23. With the backlight module, the circuit configuration in a wiring substrate unit of a light source module is shown in FIG. 10 and the overall circuit configuration of the stand for back light module is shown in FIG. 11. In the wiring substrate unit of the light source module of FIG. 10, each of the R, G, and B wiring lines can be driven by a constant-voltage power supply for signal-based switching by use of a transistor 24. With the entire backlight module of FIG. 11, a control circuit is composed of horizontal and vertical shift registers, each being used to control the on/off state of each wiring substrate unit. Within each unit, an output of a flip-flop 25 is inputted to the gate of the transistor 24 to turn LED devices in the R, G, and B wiring lines ON or OFF to cope with vertical and horizontal signal control. Thus, each wiring substrate unit can be driven through planar-split area control.

Figure 12:
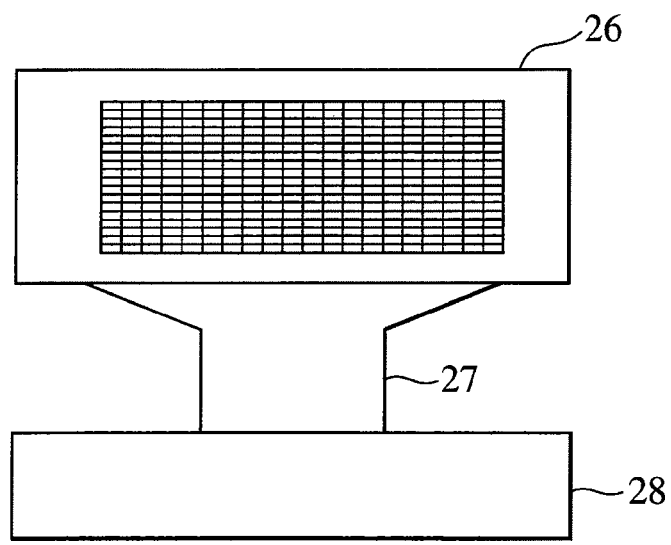
FIG. 12 is a top view of a small or middle scale sized liquid crystal display panel display device using the LED device backlight module according to the present invention.

The configuration of LED devices and the configuration of the wiring substrate unit according to the present embodiment are applicable not only to a light source module for illumination devices but also to a backlight source for large scale sized liquid crystal panel display devices as well as small and middle scale sized liquid crystal display devices, such as liquid crystal display panels for personal computers and car navigation systems. FIG. 12 shows the configuration of a small or middle scale sized liquid crystal display panel 26 including a backlight module and an optical system, a circuit wiring 27, and a driver circuit 28. This configuration is applicable to an illumination device using the light source according to the present embodiment as a backlight, making it possible to provide small and middle scale sized liquid crystal display devices that can be driven by a constant power voltage.

In accordance with the present embodiment, in large scale sized and small and middle scale sized liquid crystal display devices, it is possible to enable split-image control and power control for each scene by selectively mounting each wiring substrate unit and driving it with a constant power voltage for planar-split area control. In this backlight module, the uniformity of necessary luminance and chromaticity distributions can be ensured by appropriate optical arrangement of each wiring substrate unit.

Second Embodiment

A second embodiment of the present invention will be explained below with reference to FIGS. 13 to 15.

Although the present embodiment configures a wiring substrate unit like in the first embodiment, the present embodiment is characterized in that a wiring resistance is provided in advance in each of the R-, G-, and B-LED device wiring lines. In the wiring substrate unit, a difference occurs in current-voltage characteristics of R-, G-, and B-LED devices resulting in characteristic variation and, therefore, it is necessary that LED devices can be driven by a constant power voltage. In order to enable operation as a backlight of a liquid crystal display device on a required power voltage 12V, a resistance required for each of the R-, G-, and B-LED device wiring lines is monitored beforehand. It is possible to determine a difference between the monitored resistance and the actually measured resistance by comparing these values in the inspection process. During inspection, a function of feedback control is performed so as to drive the LED devices with a 12V voltage by adjusting the resistance of the resistance wiring through function trimming, simultaneously with LED device lighting inspection for each line.

Figure 13:
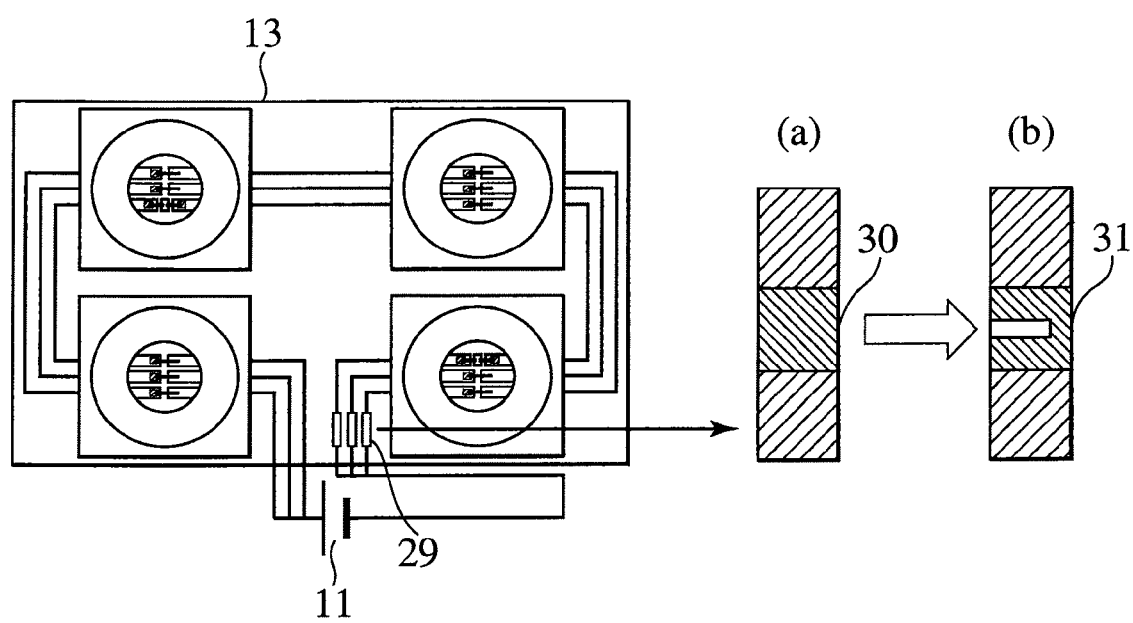
FIG. 13 is a top view of the configuration of a wiring substrate unit mounting resistance wiring according to the present invention (FIG. 13(a) showing resistance wiring before trimming and FIG. 13(b) resistance wiring after trimming).
Figure 14:
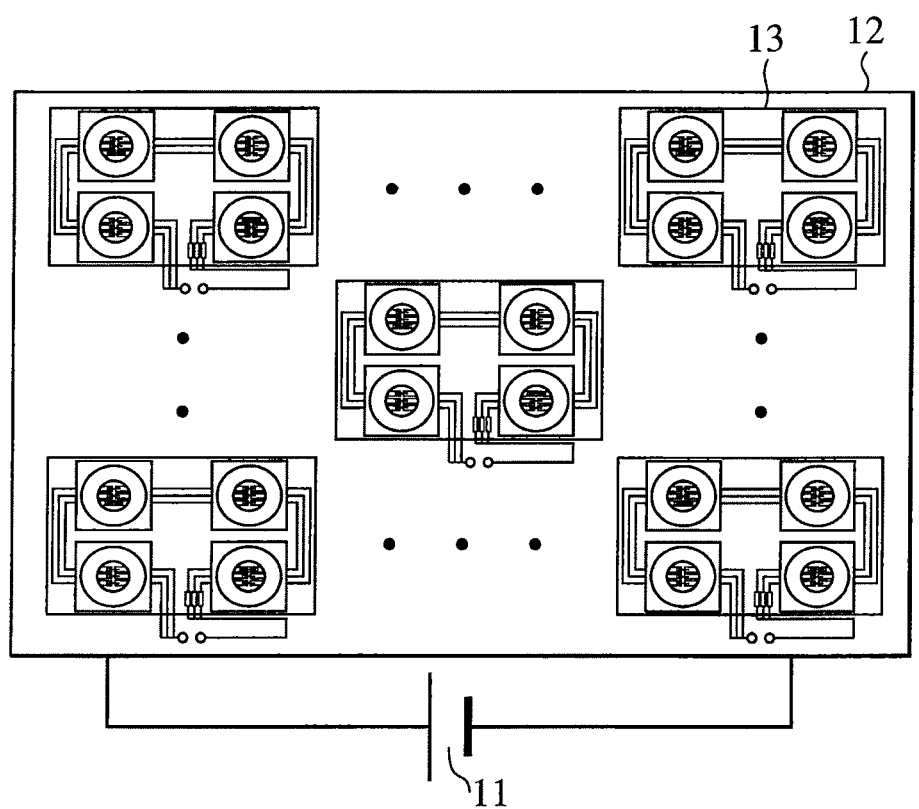
FIG. 14 is a top view showing the backlight configuration with planar-split area control, driven by a constant-voltage power supply, according to the present invention.

Referring to FIG. 13, wiring processing is performed for a preset resistance wiring 29 to obtain a required resistance in each wiring substrate unit. Here, in order to set a required resistance from a resistor 30 of FIG. 13(a) (showing the initial wiring resistance) in the inspection process, function trimming is applied through laser processing to adjust the resistor 30 to a trimming resistor 31 of FIG. 13(b). When a required resistance is set, it is possible to set, in the above-mentioned inspection process, the operating temperature to a range, for example, from 40 to 50° C. as an environmental condition where the backlight of the liquid crystal display device operates in steady state. When a specific operating temperature is set by applying the above-mentioned function trimming for adjusting the device resistance on the wiring substrate through the wiring resistance, it becomes unnecessary to provide the variable resistor 10 that was required in FIG. 6. Further, through the inspection process and the adjustment of the wiring resistance, it becomes possible to control the operating current in relation to device characteristic variation for each wiring substrate unit. As a backlight of a liquid crystal display device, these measures make it possible to set the operating voltage under a condition most suitable for the operating environment and ensure a sufficient light intensity in consideration of the luminous efficiency. Similar to the first embodiment, it is possible to provide a backlight module which operates on a constant power voltage shown in FIG. 14 by implementing the above-mentioned wiring substrate unit having defined resistance and specified operating voltage.

Figure 15A:
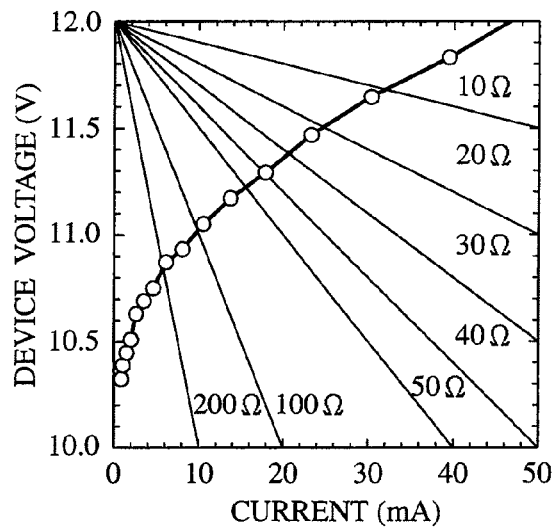
FIGS. 15A, 15B, and 15C are diagrams showing an example of current-voltage characteristics and operating point in a series arrangement of R-, G-, and B-LED devices, respectively, according to the present invention.
Figure 15B:
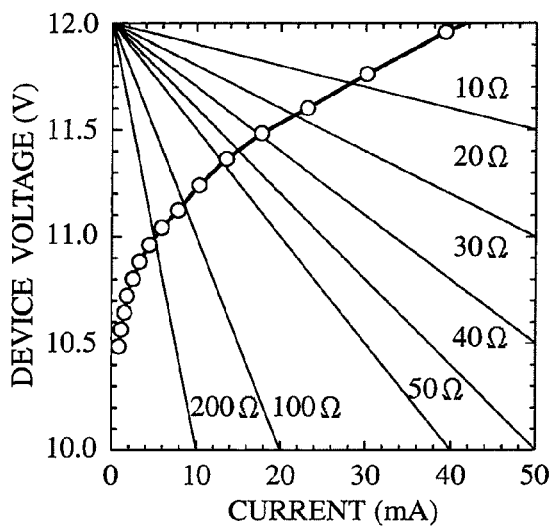
Figure 15C:
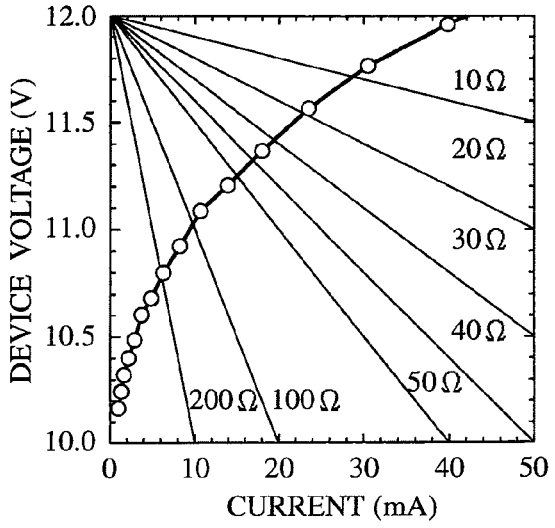

FIGS. 15A, 15B, and 15C show current-voltage characteristics of the R, G, and B wiring lines, respectively, and an example of operating point in relation to the wiring resistance introduced. FIG. 15 demonstrates that, for each of the R, G, and B wiring lines, the operating current can be set to 40 to 50 mA under a 12V operation voltage depending on the adjustment value of the wiring resistance setup. A current to be injected into LED devices can also be controlled by the resistance setup of each of the R, G, and B wiring lines, and the operating current can be controlled in relation to device characteristic variation for each wiring substrate unit by adjustment of the wiring resistance at the time of inspection. It also becomes possible to design a predetermined light intensity and white balance for each wiring substrate unit based on a design required as a whole backlight module.

As a backlight of a liquid crystal display device, these measures make it possible to control the operating current in the operating environment, set an operating voltage under practically required operating conditions, and ensure a sufficient light intensity in consideration of the luminous efficiency.

In accordance with the present embodiment, it is possible to operate R-, G-, and B-LED devices with a single constant-voltage power supply, and to drive each wiring substrate unit by means of a 12V constant power voltage built in the liquid crystal display device. Further, a wiring substrate unit is provided which can be driven by a constant power voltage through resistance adjustment. The configuration of LED devices and the configuration of the wiring substrate unit according to the present embodiment are applicable not only to a light source module for illumination devices but also to a backlight source for liquid crystal panel display devices for television, liquid crystal display panels for personal computers, or car navigation systems.

Third Embodiment

A third embodiment of the present invention will be explained below with reference to FIGS. 16 to 28.

Figure 24:
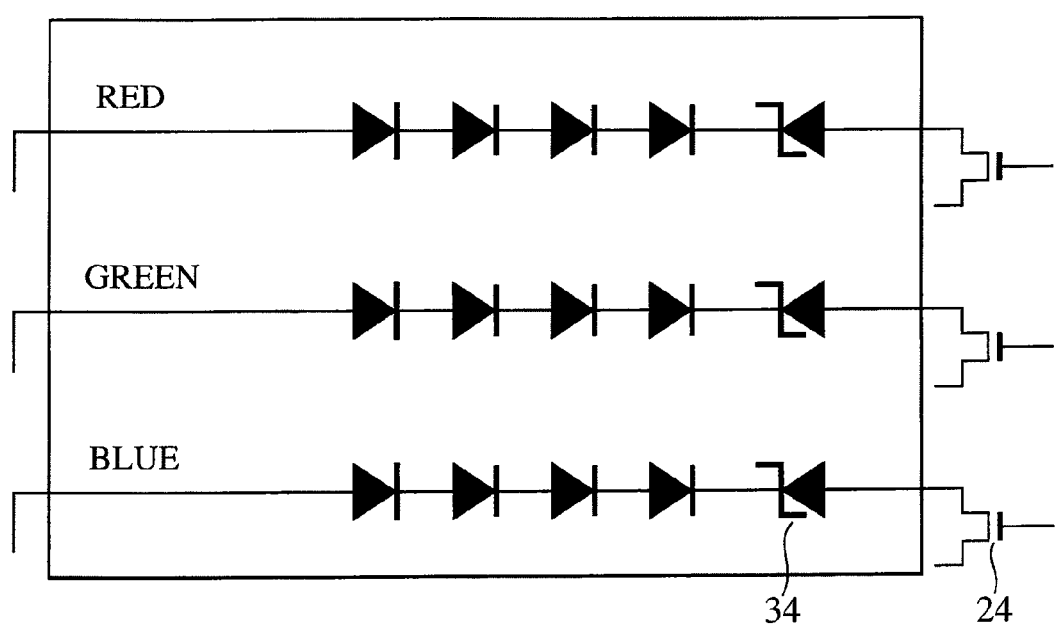
FIG. 24 is a top view showing the circuit configuration mounted on a wiring substrate unit according to the present invention.
Figure 27:
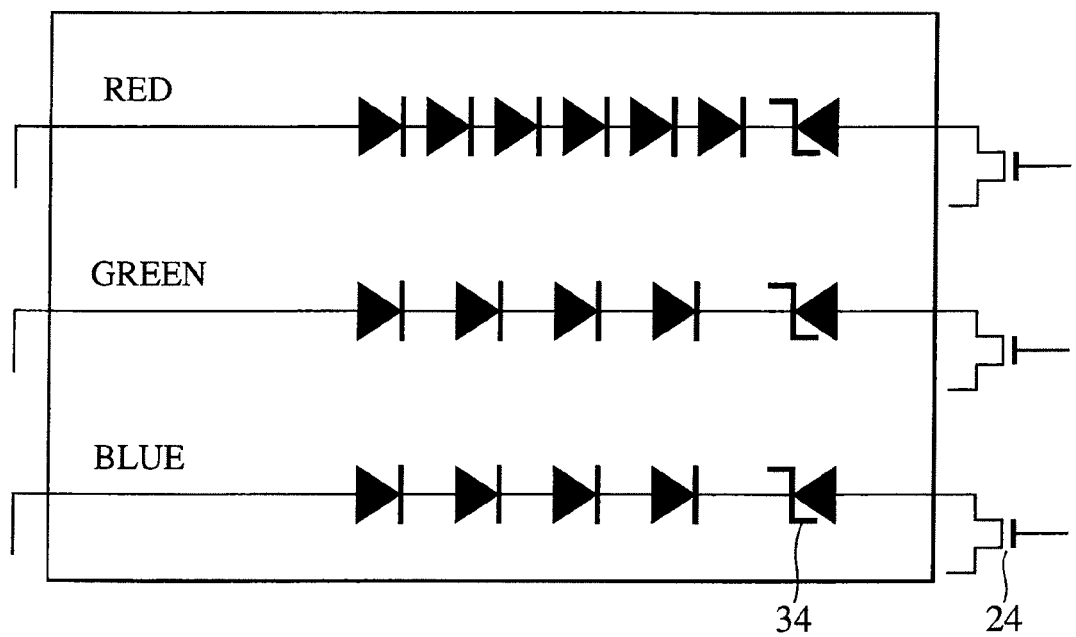
FIG. 27 is a top view showing the circuit configuration mounted on a wiring substrate unit according to the present invention.

Similar to the second embodiment, the present embodiment configures a wiring substrate unit and is characterized in that a zener diode, as represented by zener diode 32 in FIGS. 16, 17, 20 and 21 and circuit with zener diode 34 in FIGS. 24 and 27, for example, is provided in each of the R-, G-, and B-LED device wiring lines. The present embodiment is provided with a function to drive the LED devices on a 12V or 24V drive voltage while adjusting the resistance of resistance wiring through function trimming and performing temperature compensation of the operating voltage by use of a zener diode, simultaneously with LED device lighting inspection for each line.

Figure 16:
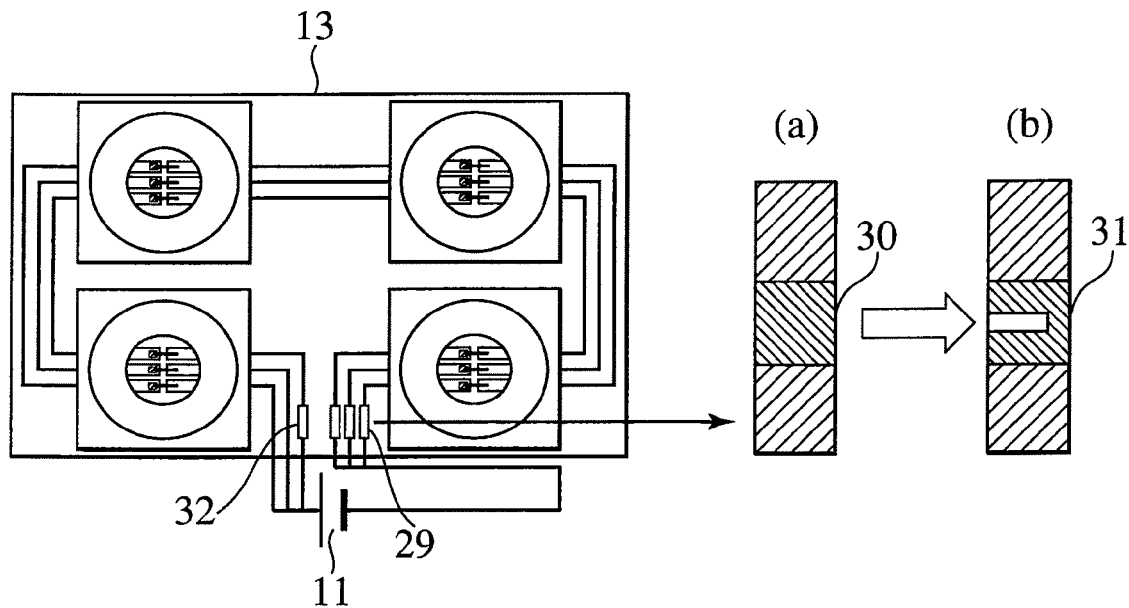
FIG. 16 is a top view of a wiring substrate unit mounting resistance wiring and a zener diode according to the present invention (FIG. 16(a) showing resistance wiring before trimming and FIG. 16(b) resistance wiring after trimming).
Figure 17:
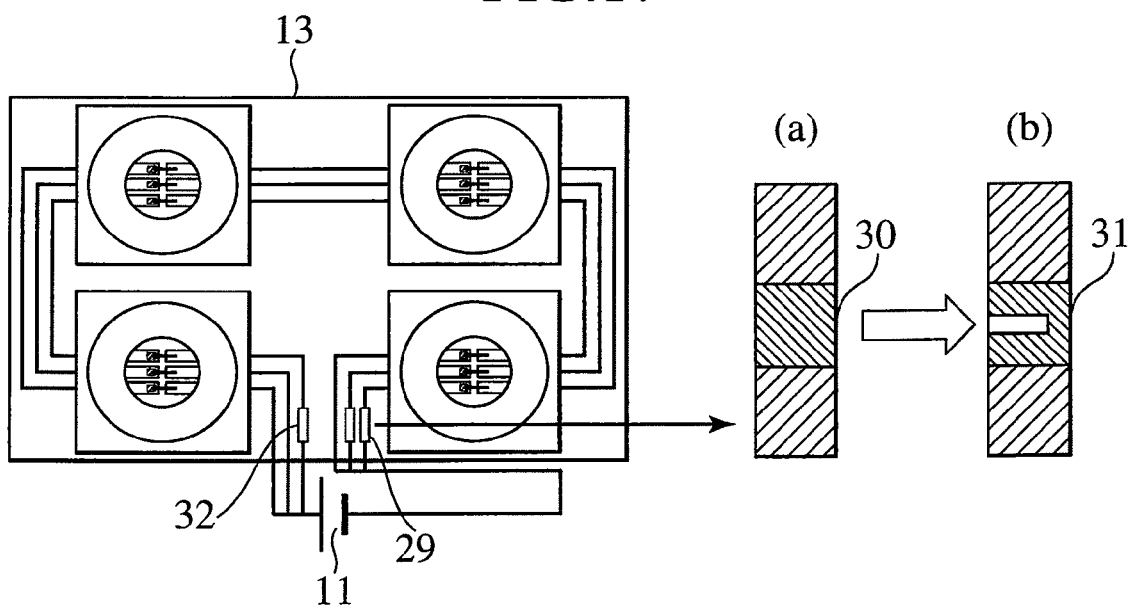
FIG. 17 is a top view of a wiring substrate unit mounting resistance wiring and a zener diode according to the present invention (FIG. 17A showing resistance wiring before trimming and FIG. 17B resistance wiring after trimming).

First of all, an example for applying this function to the R-LED device wiring line is shown. FIG. 16 is a diagram showing a case where a zener diode is provided in the R-LED device wiring line. Four R-LED devices and a zener diode are implemented in the R-LED device wiring line. It is made possible to drive the R-LED device wiring line at around 12V voltage because of the 7 to 8V operating voltage of the four R-LED devices and the 4 to 5V operating voltage of the zener diode. In this case, in order to set a required resistance from the resistor 30 of FIG. 16(a) (showing the initial wiring resistance) in the inspection process, function trimming is applied, for example, through laser processing by forming a cut in the resistor 30 to adjust the resistance of resistor 30 to the resistance of the resultant trimming resistor 31 of FIG. 16(b) having the cut therein. The trimming resistor 31 can control the operating voltage of the R-LED device wiring line to 12V. FIGS. 17A and 17B show a case where the operation voltage is set to 12V in consideration of the internal resistance of the zener diode without the wiring resistance in the R-LED device wiring line. Referring to FIGS. 16 and 17, the operating voltage of the G- and B-LED device wiring lines is set to 12V by adjustment of respective wiring resistance.

Figure 18:
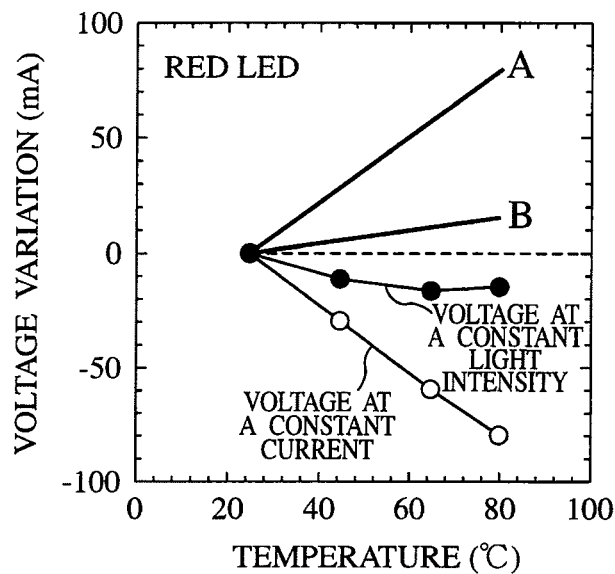
FIG. 18 is a diagram showing an example of voltage variation to temperature in a series arrangement of R-LED devices according to the present invention.
Figure 19:
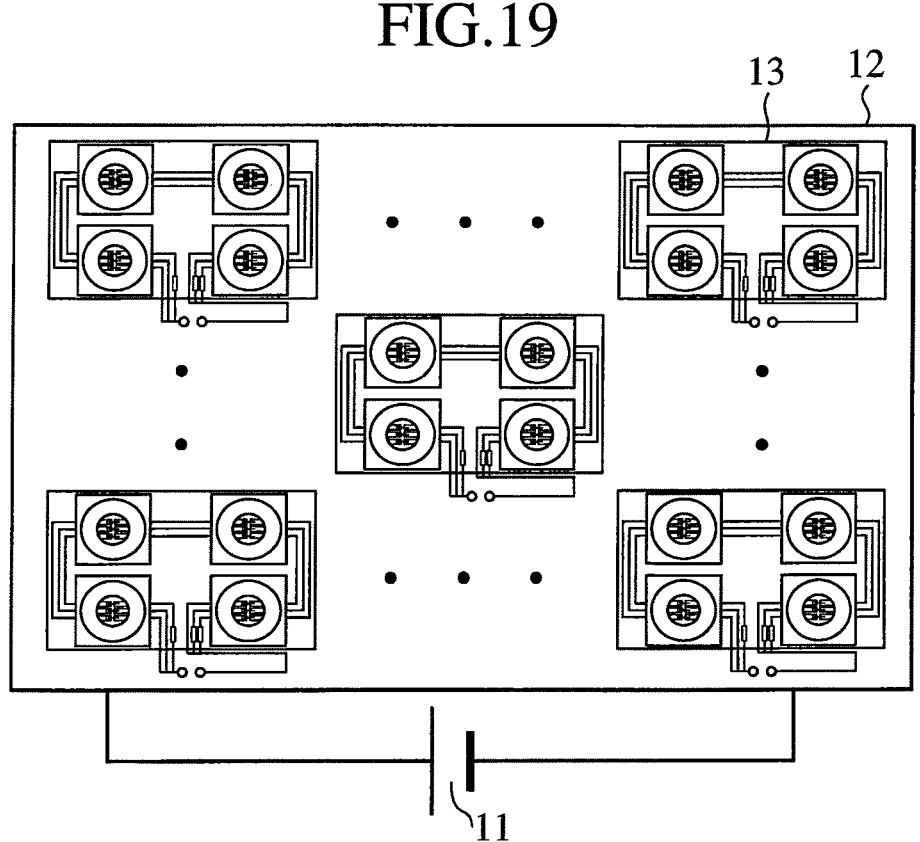
FIG. 19 is a top view showing the backlight configuration with planar-split area control, driven by a constant-voltage power supply, according to the present invention.

With the above-mentioned zener diode, it is possible to compensate the operating voltage variation to temperature of an R-LED device through designing in consideration of a temperature coefficient of the operating voltage. FIG. 18 plots voltage variations in relation to the operating temperature of a R-LED device. With the LED device composed of a semiconductor, because of the activation of conductor carriers associated with temperature, the higher the temperature, the lower becomes the voltage under a constant-current condition. Accordingly, the temperature coefficient of the voltage variation of the LED device becomes negative. Referring to FIG. 18, if a zener diode that can operate based on a positive temperature coefficient shown by the A line is selected in relation to the voltage variation during constant current, it is possible to compensate the voltage variation of the R-LED device during constant current. The temperature coefficient shown by the A line applies to a case where at least 10V is applied to the zener diode. On the other hand, it is necessary to drive a LED device under a condition of constant light intensity and constant luminance even if the temperature changes. Accordingly, when the temperature dependency of the operating voltage under a condition of constant luminance and constant light intensity was investigated, a result shown in FIG. 18 was obtained. Under this condition, the B wiring line compensates the operating voltage variation of the R-LED device. The temperature coefficient shown by the B wiring line is a positive temperature coefficient obtained when operating the zener diode at 4 to 6V. This makes it possible to compensate the voltage variation to temperature of the R-LED device operating under a condition of constant luminance and constant light intensity with lower voltage. That is, the 12V operation voltage can be attained by the combination of the operating voltage of R-LED devices in the wiring line with the operating voltage of the zener diode. Further, based on the temperature coefficient for the operating voltage variation of the zener diode, the cancellation of the voltage variation of R-LED devices and temperature compensation can be attained at the same time. Like in the first and second embodiments, it is possible to provide a backlight module shown in FIG. 19 which operates on a constant power voltage by properly arranging the above-mentioned wiring substrate unit.

Figure 20:
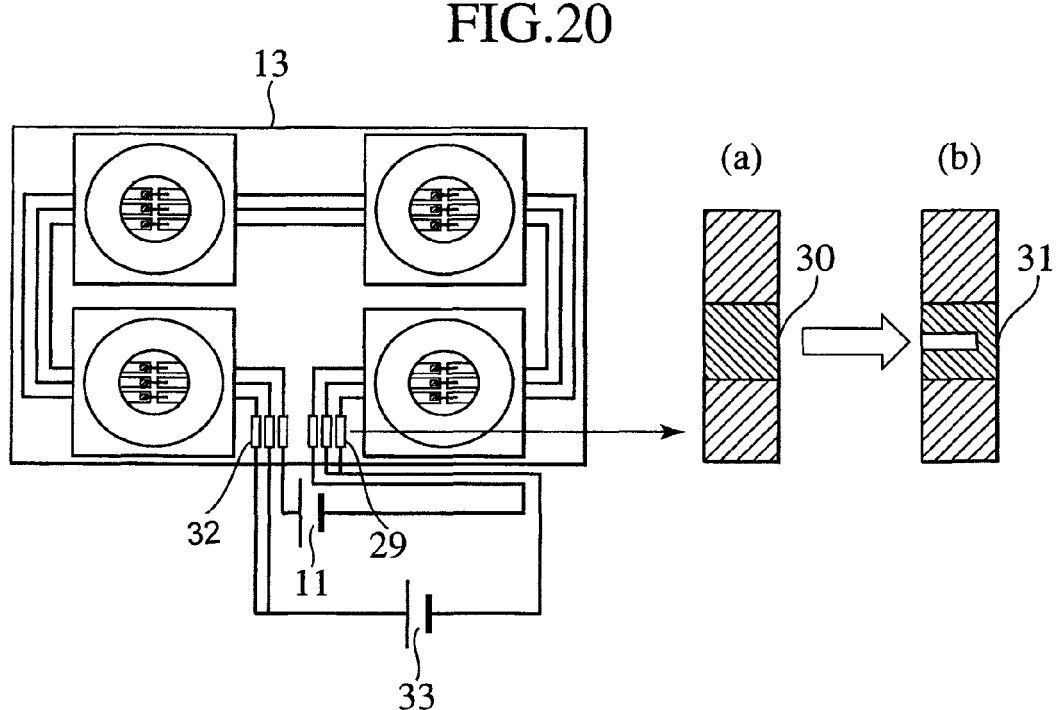
FIG. 20 is a top view of a wiring substrate unit mounting resistance wiring and a zener diode according to the present invention and a constant-voltage power supply (FIG. 20(a) showing resistance wiring before trimming and FIG. 20(b) resistance wiring after trimming).
Figure 21:
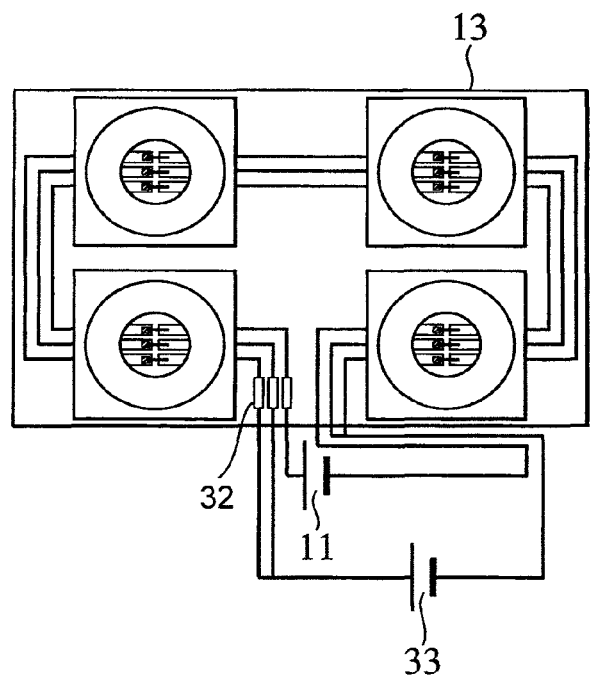
FIG. 21 is a top view of a wiring substrate unit mounting a zener diode and a constant-voltage power supply according to the present invention.
Figure 22A:
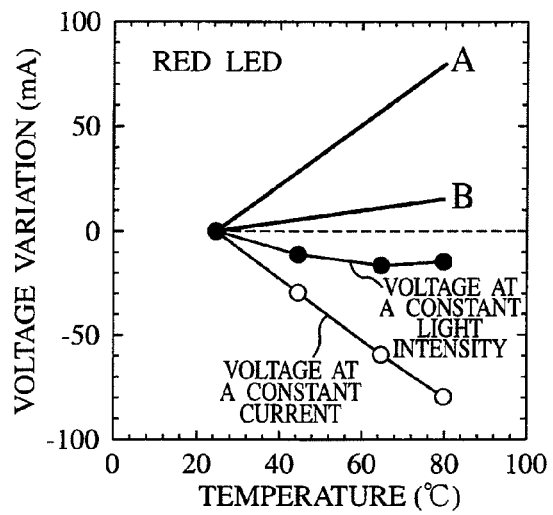
FIGS. 22A, 22B, and 22C are diagrams showing an example of voltage variation to temperature in a series arrangement of R-, G-, and B-LED devices, respectively, according to the present invention.
Figure 22B:
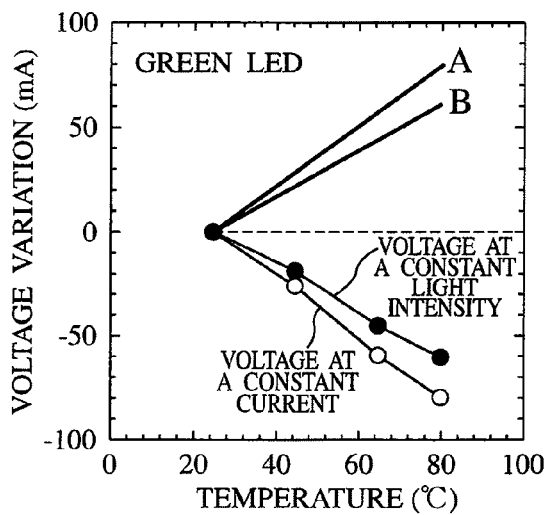
Figure 22C:
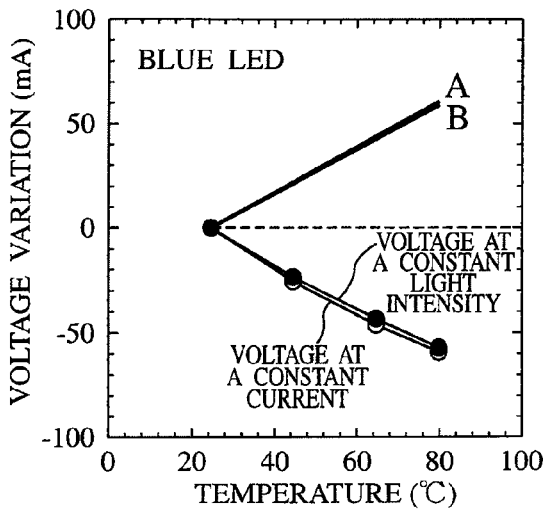

A case where a zener diode is applied also to the G- and B-LED device wire lines will be explained below. Referring to FIGS. 20(a) and 20(b), a zener diode is mounted in each of the R-, G-, and B-LED device wiring lines. FIG. 21 shows a case where the operating voltage can be controlled through designing in consideration of the internal resistance of the zener diode without the wiring resistance. Referring to FIGS. 20 and 21, effects of a zener diode on the LED devices are as shown above. Since the voltage variation to temperature increases for the G- and B-LED device wiring lines, it is necessary to increase the operating voltage of the zener diode. Therefore, for the G- and B-LED device wiring lines, a 24V constant voltage is applied for a constant-voltage power supply 33 shown in FIGS. 20 and 21. FIGS. 22A, 22B, and 22C show the voltage variation to temperature of not only a R-LED device but also G- and B-LED devices. When a G- or B-LED device operates under a condition of constant luminance and constant light intensity, the voltage variation to temperature reveals a tendency close to the condition during constant current. Accordingly, it is necessary to increase the temperature coefficient of the operating voltage for compensation by the increased operating voltage of the zener diode.

Figure 23:
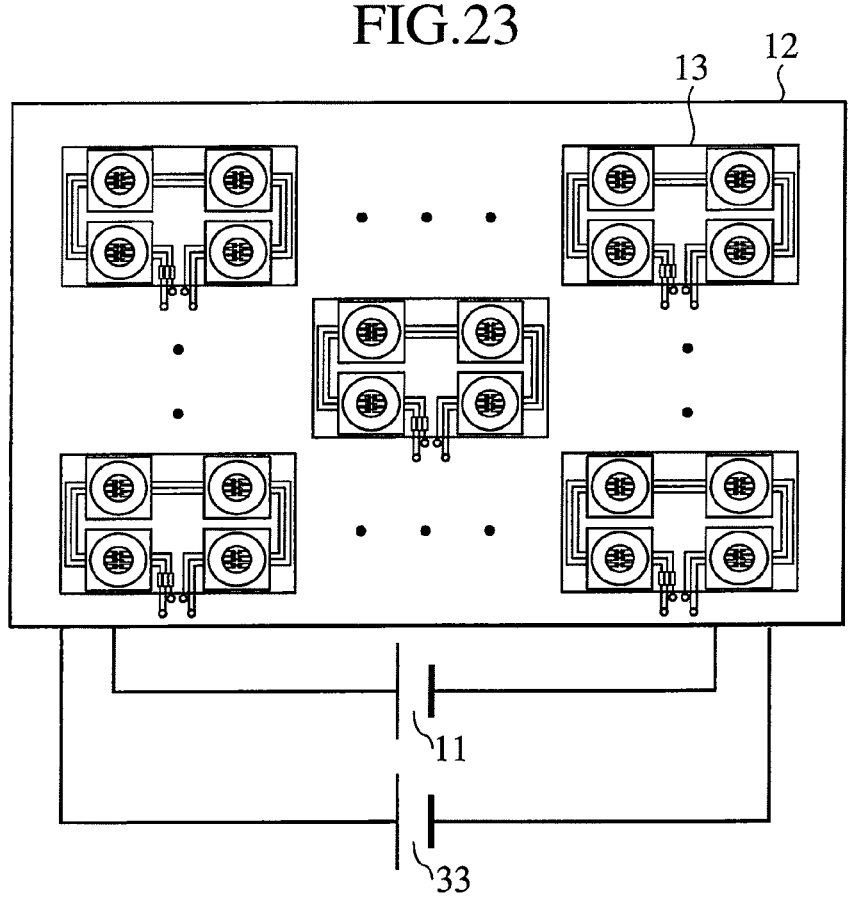
FIG. 23 is a top view showing the backlight configuration with planar-split area control, driven by a constant-voltage power supply, according to the present invention.
Figure 25:
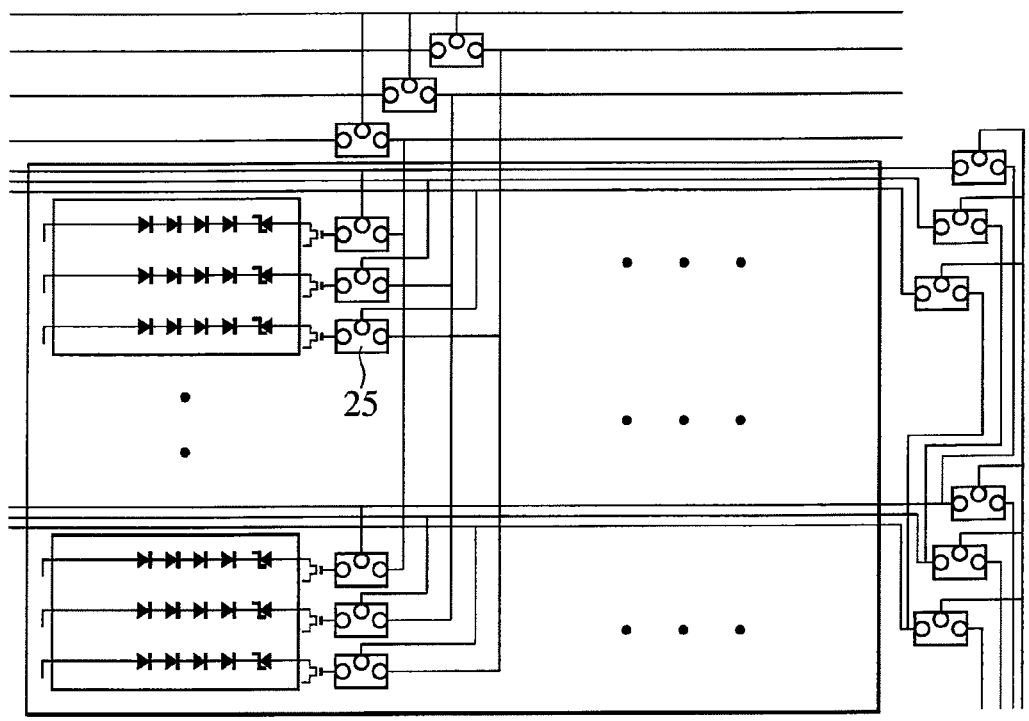
FIG. 25 is a top view showing the circuit configuration with planar-split area control, driven by a constant-voltage power supply, according to the present invention.
Figure 26:
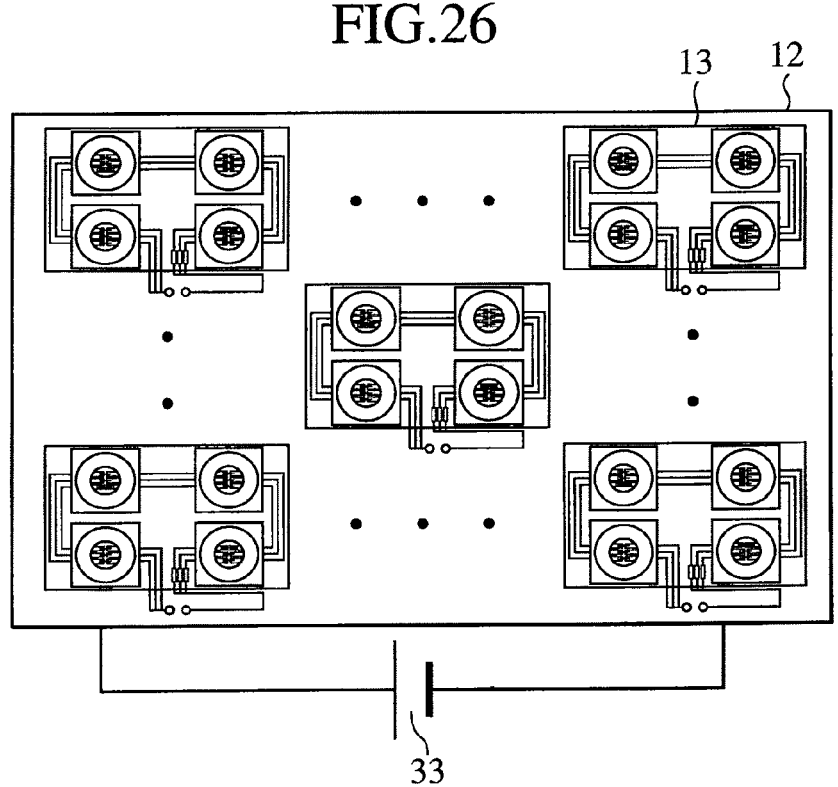
FIG. 26 is a top view showing the backlight configuration with planar-split area control, driven by a constant-voltage power supply, according to the present invention.
Figure 28:
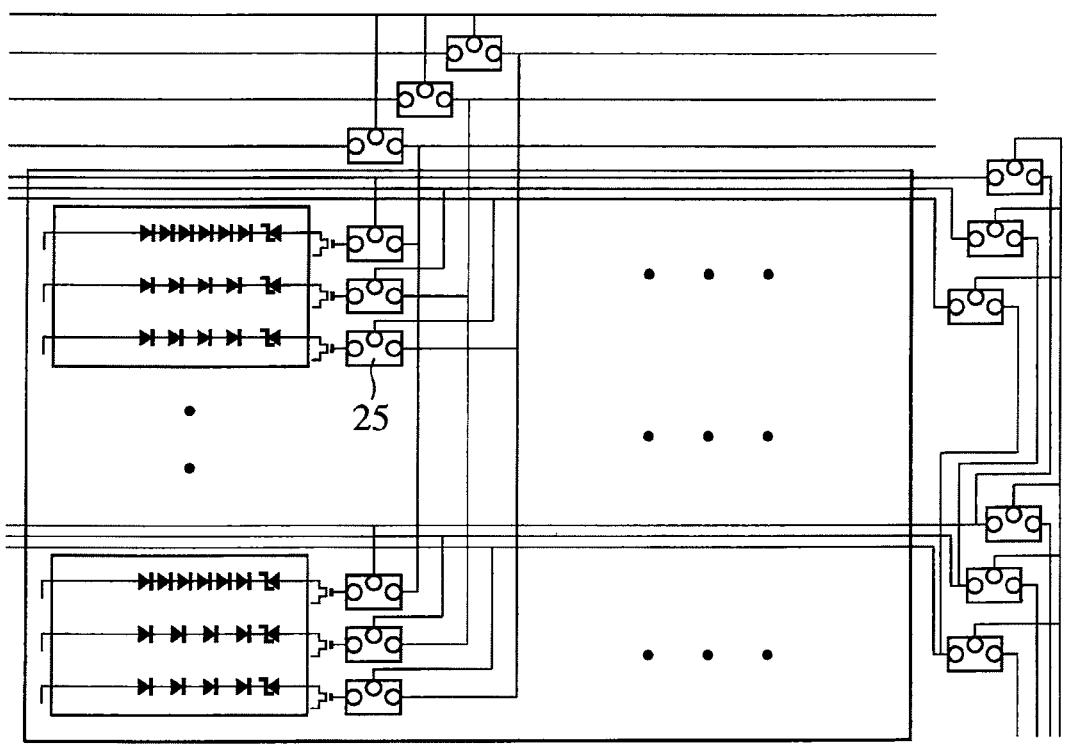
FIG. 28 is a top view showing the circuit configuration with planar-split area control, driven by a constant-voltage power supply, according to the present invention.

FIGS. 23, 24, and 25 show a case where a circuit with zener diode 34 is introduced, a constant-voltage power supply 11 with a 12V constant voltage is set in the R-LED device wiring line, and a constant-voltage power supply 33 with a 24V constant voltage is applied to the G- and B-LED device wiring lines to form a wiring substrate unit and a stand for backlight module. Further, FIGS. 26, 27, and 28 show a case where the constant-voltage power supply 33 with a 24V constant voltage is commonly applied to the R-, G-, and B-LED device wiring lines to form a wiring substrate unit and a stand for backlight module. In either case, it is possible to compensate the voltage variation to temperature of each of the R-, G-, and B-LED device wiring lines for each wiring substrate unit.

The above-described configurations make it possible to attain temperature compensation of the designed operating voltage without separately introducing a temperature compensation circuit even for the operating temperature as a backlight of a liquid crystal display device. The operating voltage to be subjected to temperature compensation is used as a voltage application condition for operation under a condition of constant luminance and constant light intensity.

In accordance with the present embodiment, it is possible to attain a configuration which allows each of the R-, G-, and B-LED devices to be driven with 12V or 24V constant-voltage power supply and the devices to be driven by a constant-voltage power supply built in a liquid crystal display device through distribution from a 24V power voltage for AC-DC conversion. Further, the present embodiment provides a wiring substrate unit that enables temperature-compensation control wherein the operating voltage variation to temperature is canceled by the introduced zener diode. Further, the configuration of LED devices and the configuration of the wiring substrate unit according to the present embodiment are applicable not only to a light source module for illumination devices but also to a backlight source for liquid crystal display panel devices for television, liquid crystal display panels for personal computers, or car navigation systems.

Fourth Embodiment

Figure 29:
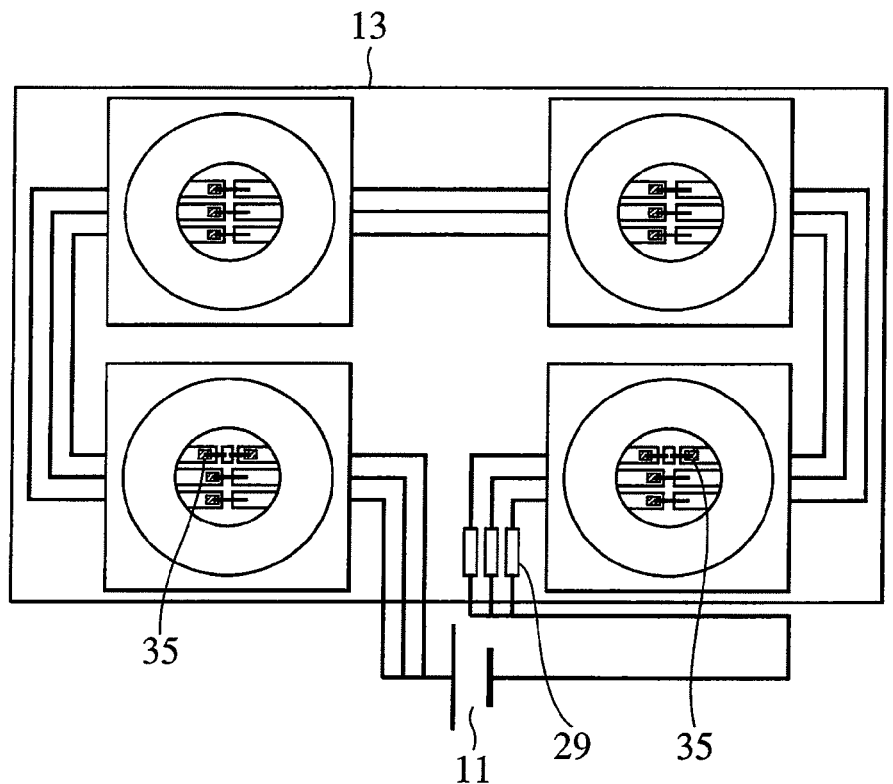
FIG. 29 is a top view of a wiring substrate unit mounting an infrared LED device and resistance wiring and a constant-voltage power supply according to the present invention.

A fourth embodiment of the present invention will be explained below with reference to FIGS. 36 to 29.

The present embodiment uses the configuration of the first embodiment, and is characterized in that some of the LED devices implemented in the light source module are used for a purpose other than a light source. In particular, since the light source module unit explained in the first embodiment implements six R-LED devices in addition to four B-LED devices and four G-LED devices, it may be possible to use some of the R-LED devices for a purpose other than a light source, for example, for infrared communication.

As a result, with the present embodiment, a plurality of R-, G-, and B-LED devices are composed of at least two different types of devices having different wavelengths, and R-, G-, and B-LED devices in respective independent wiring lines are driven in parallel by a single power voltage.

The specific configuration of the present embodiment will be explained below.

In a wiring substrate unit, under a condition that white balancing is made and the uniformity of luminance and chromaticity is ensured, devices having different wavelengths can be introduced as R-, G-, and B-LED devices. Referring to FIG. 29, in the case of the R-LED devices out of the R-, G-, and B-LED devices, for example, four R-LED devices out of six are used to maintain luminance and white balance required as a backlight, and two remaining R-LED devices are set as infrared LED devices 35. In the embodiment of a wiring substrate unit, if the red visible light wavelength region of a R-LED device (610 to 640 nm) and the infrared wavelength region of an infrared LED device (780 to 1100 nm) are selectively used, it is possible to configure a light source module composed of at least two different types of LED devices having different wavelengths enabling infrared communication. For infrared communication, it is desirable to mount a LED device having a wavelength of around 950 nm, within a range from 830 to 1030 nm, to which a photodetector is highly sensitive.

A LED device having the infrared wavelength region enables an illumination device or a liquid crystal display device to exchange signals with external through infrared communication, and can be used as a light source for bidirectional communication. It is possible through infrared communication to receive textual information, music information, and information accompanying images from an illumination device or a liquid crystal display device. An apparatus on the reception side may be a personal computer, an information terminal device, etc. Transmission to a recording medium, etc. may also be applied.

Figure 30:
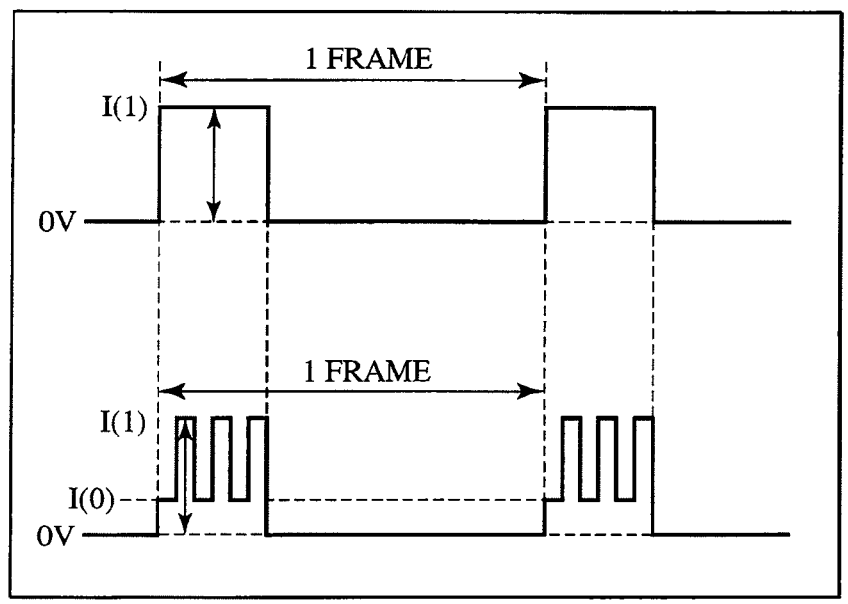
FIG. 30 is a diagram showing an exemplary pulse signal and superimposed signal in an infrared LED device mounted on a wiring substrate unit according to the present invention.

Referring to FIG. 30, a communication signal for high-speed modulation as shown at the bottom can be superimposed on a one-frame image signal of a normal display device as shown at the top. This makes it possible to perform infrared communication with an external apparatus through an infrared LED device in relation to a signal for driving the R-LED device wiring line.

FIG. 30 shows a case of signal waveforms applied to the backlight through pulse width modulation (PWM) control in one frame. A voltage waveform of a backlight signal according to the conventional technique is shown at the top, and a voltage waveform of a backlight signal according to the present embodiment at the bottom. The conventional backlight signal is subjected to PWM control in synchronization with the image signal and therefore is associated with a rectangular waveform having a voltage level of I(1). By contrast, in accordance with the present embodiment, a comb-shaped waveform having a voltage level of I(1) is superimposed on a base waveform having a voltage level of I(0) to form a backlight signal waveform. Here, in order to achieve an intensity which is approximately the same as that of the conventional backlight signal, it is possible to control the intensity by setting a wider waveform having a voltage level of I(0) or a higher waveform having a voltage level of I(1) than the conventional case. The width of each comb-shaped waveform having a voltage level of I(1) is controlled while the luminance of the backlight is controlled, whereby a signal different from that in backlight illumination can be transmitted. In accordance with the present embodiment, an infrared LED device is mounted in the R-LED device wiring line and the above-mentioned comb-shaped waveform signal is superimposed, thereby making it possible to perform infrared communication with an external infrared detector. Thus, the R-LED device can be served as a backlight source for illuminating the liquid crystal display panel, and the infrared LED device as a light source for infrared communication.

An external receiver having an infrared detector may be a television remote controller, a personal computer, a PDA, or an apparatus having wireless communication function. Thus, an infrared signal superimposed on the backlight signal makes it possible to take out a desired signal from a display device having a backlight source according to the present embodiment, thereby attaining signal exchange between the liquid crystal display device and an information terminal apparatus.

Figure 31:
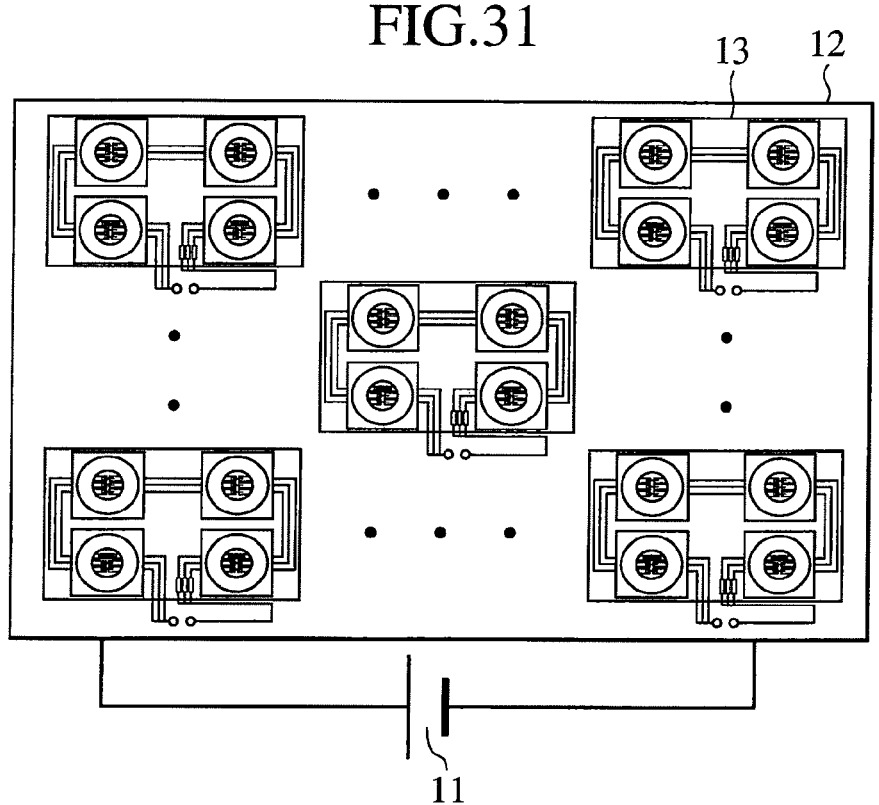
FIG. 31 is a top view showing the backlight configuration with planar-split area control, driven by a constant-voltage power supply, according to the present invention.
Figure 32:
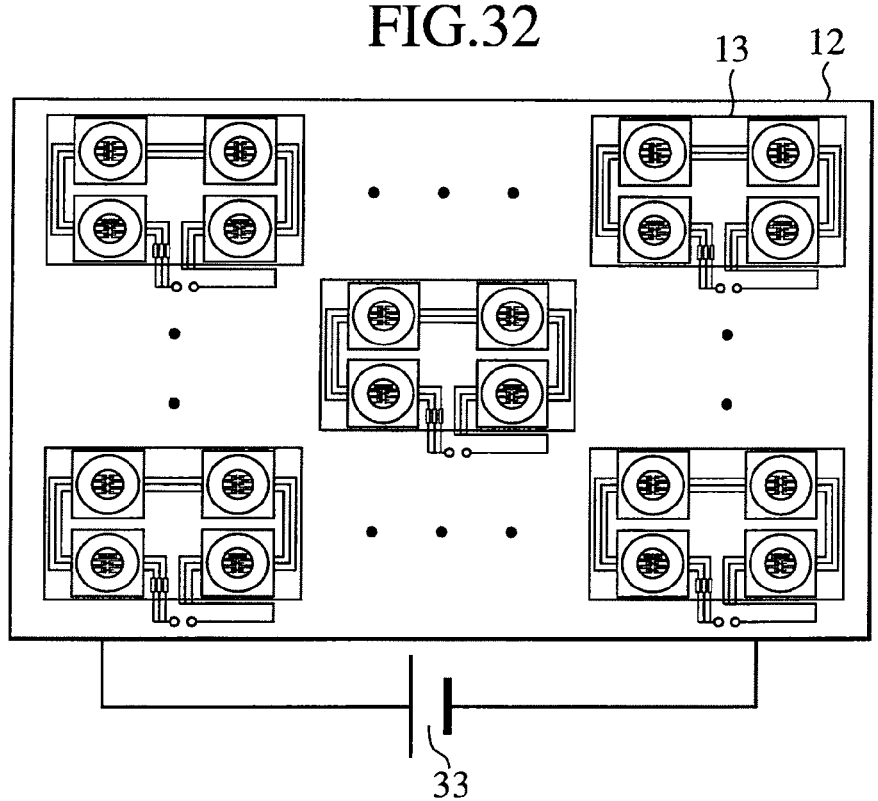
FIG. 32 is a top view showing the backlight configuration with planar-split area control, driven by a constant-voltage power supply, according to the present invention.
Figure 33:
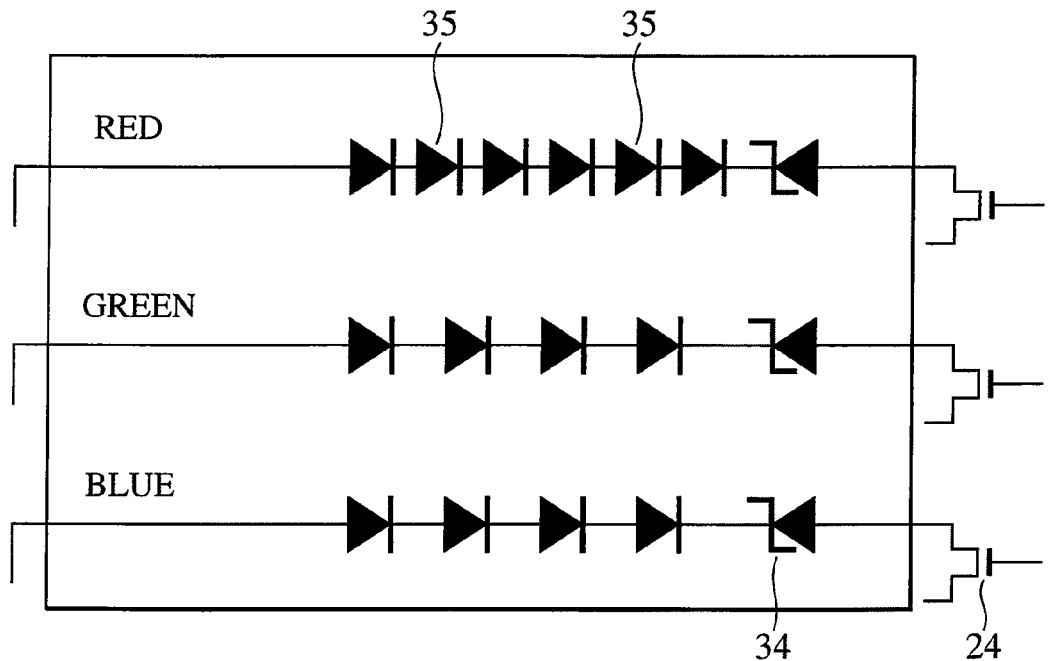
FIG. 33 is a top view showing the circuit configuration mounted on a wiring substrate unit according to the present invention.
Figure 34:
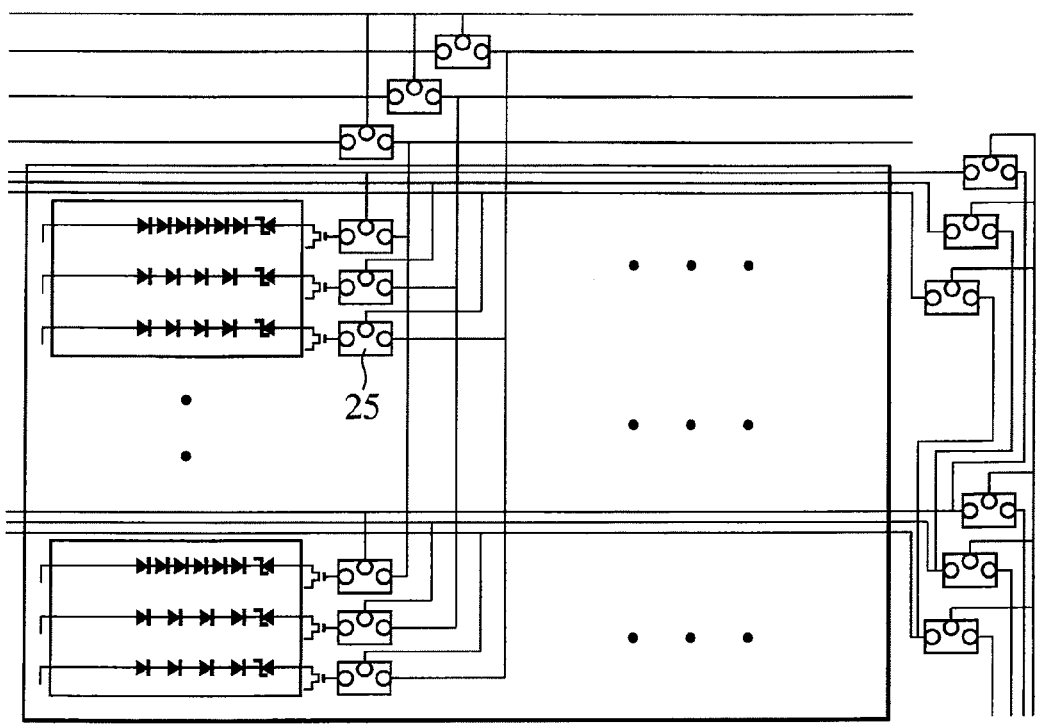
FIG. 34 is a top view showing the circuit configuration with planar-split area control, driven by a constant-voltage power supply, according to the present invention.

FIG. 31 shows a configuration in which the wiring resistance is provided to enable operation with a 12V constant-voltage power supply similar to the above-mentioned embodiment. Further, FIG. 31 shows a configuration in which a zener diode is provided to enable operation with a 24V constant-voltage power supply similar to the above-mentioned embodiment. FIGS. 33 and 34 are views showing that the circuit configuration of a wiring substrate unit and the circuit configuration of a stand for backlight module can be manufactured, respectively, similar to the embodiment that introduces a zener diode.

Figure 35:
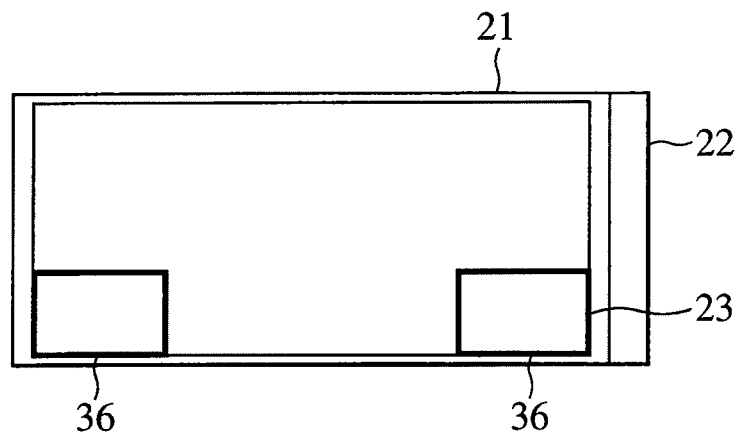
FIG. 35 is a top view of a large scale sized liquid crystal display panel display device using the backlight module mounting an infrared LED device according to the present invention.
Figure 36:
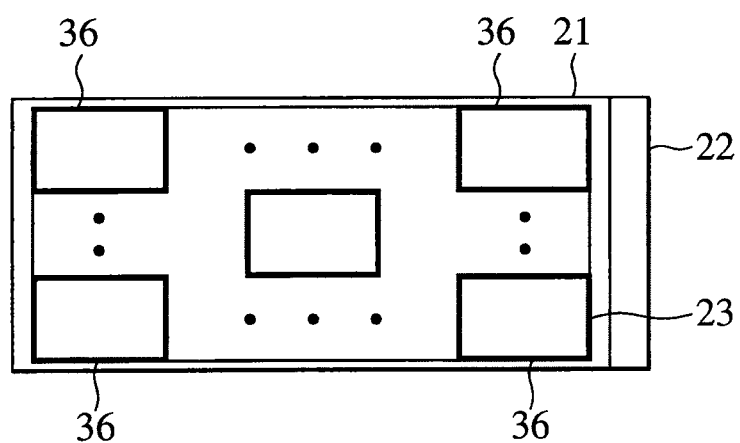
FIG. 36 is a top view of a large scale sized liquid crystal display panel display device using the backlight module mounting an infrared LED device according to the present invention.
Figure 37:
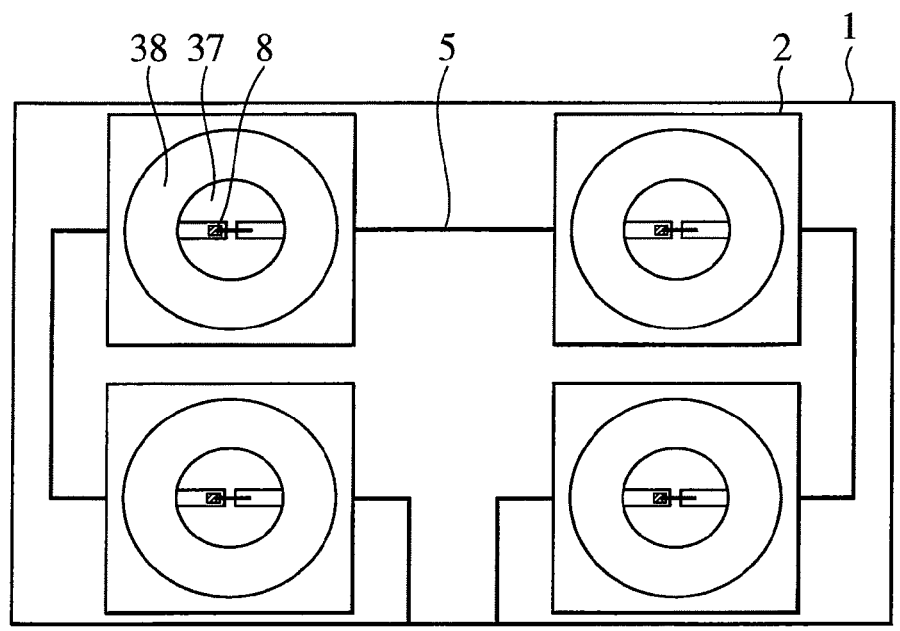
FIG. 37 is a top view showing a wiring connection mounting a white LED device according to the present invention.
Figure 38:
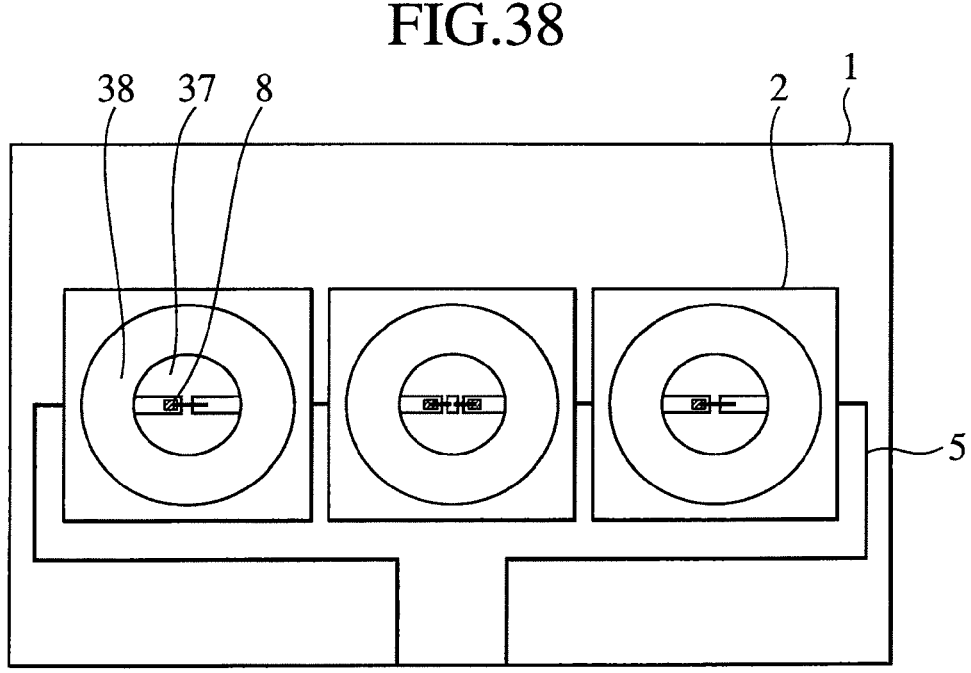
FIG. 38 is a top view showing a wiring connection mounting a white LED device according to the present invention.
Figure 39:
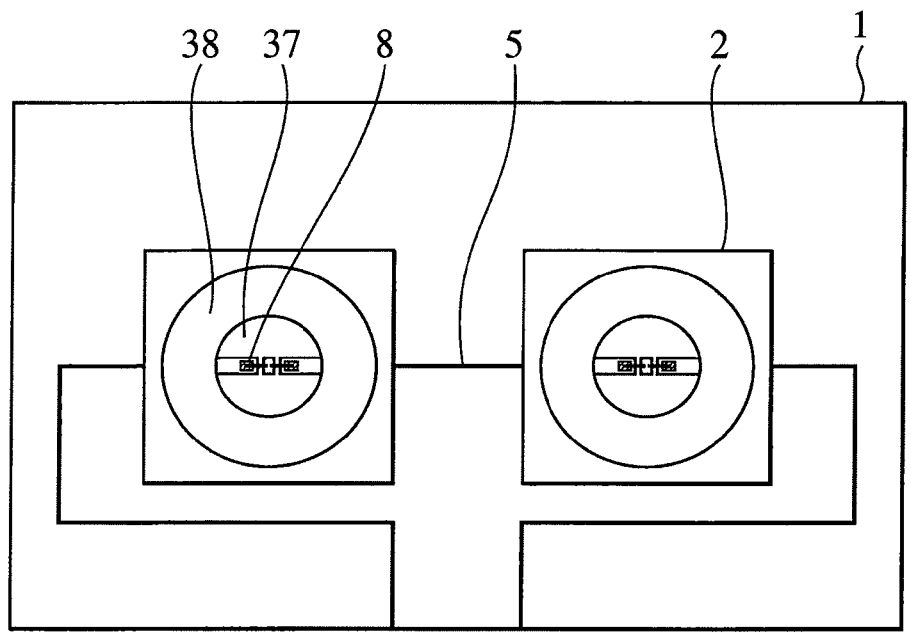
FIG. 39 is a top view showing a wiring connection mounting a white LED device according to the present invention.
Figure 40:
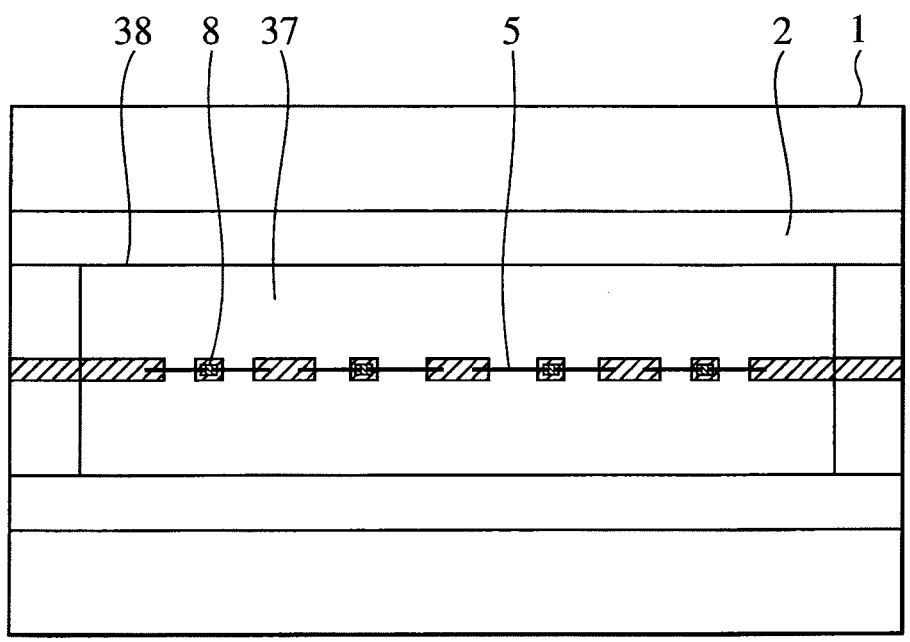
FIG. 40 is a top view showing a wiring connection mounting a white LED device according to the present invention.

FIGS. 35 and 36 show a large scale sized liquid crystal display device having light source module units 36 that mount an infrared LED device. This configuration, including a stand for backlight 21, a driver circuit 22, and a large scale sized liquid crystal display panel 23, is applicable to a large scale sized liquid crystal display television. The arrangements and configuration of a wiring substrate unit mounting an infrared LED device can be pertinently used based on an apparatus to be connected with infrared communication and signal information to be transmitted.

Further, a device having different wavelengths can be introduced as R-, G-, and B-LED devices. As long as the luminance and white balance are maintained for each wiring substrate unit, it may be possible to mount R-, G-, and B-LED devices each having two different wavelengths.

Further, in the case of the B-LED devices out of the R-, G-, and B-LED devices, for example, it is also possible to configure a light source module composed of at least two different types of LED devices having different wavelengths (the blue wavelength region of visible light and the ultraviolet wavelength region) in a mounting mode for a wiring substrate unit. A LED device having the ultraviolet wavelength region can also be used as a white light source that seals fluorescent paste.

In accordance with the present embodiment, it is possible to attain a configuration which allows R-, G-, and B-LED devices to be driven with a single power supply and each wiring substrate unit to be driven with a 12V or 24V constant-voltage power supply built-in a liquid crystal display device.

Further, at least two types of LED devices having different wavelengths can be used as a light source, allowing application of wavelength-dependent functions and uses. The configuration of LED devices and the configuration of the wiring substrate unit according to the present embodiment are applicable not only to a light source module for illumination devices but also to a backlight source for liquid crystal panel display devices for television, liquid crystal panels for personal computers, or car navigation systems.

Fifth Embodiment

A fifth embodiment of the present invention will be explained with reference to FIGS. 37 to 48.

In connection with the present embodiment, the configuration of a liquid crystal display device using a white LED light source will be explained below. This white LED light source is composed of blue LED devices and fluorescent paste optically excited to emit blue light With each of arrangements of FIGS. 37 to 40, a reflector 2 is provided on a metal substrate having an insulating layer or a ceramic substrate 1. In a B-LED device wiring line 5, a B-LED device 8 is mounted, fluorescent paste 37 is sealed, and the device is sealed in a package with transparent resin 38. It should be noted that four B-LED devices are mounted in the wiring line.

A specific configuration will be explained below.

Figure 41:
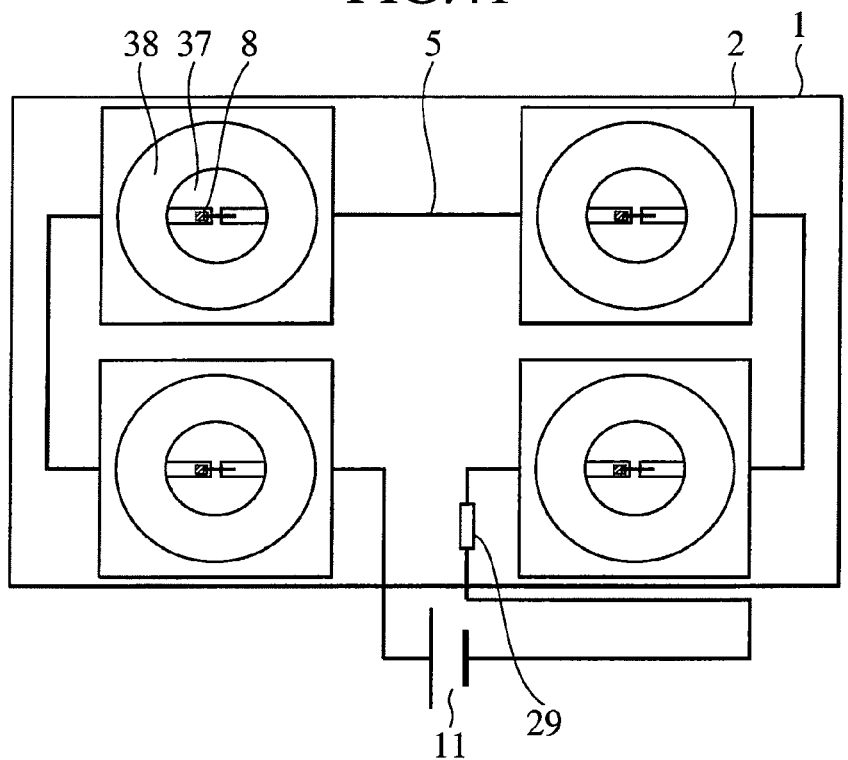
FIG. 41 is a top view of a wiring substrate unit mounting a resistance wiring according to the present invention.
Figure 42:
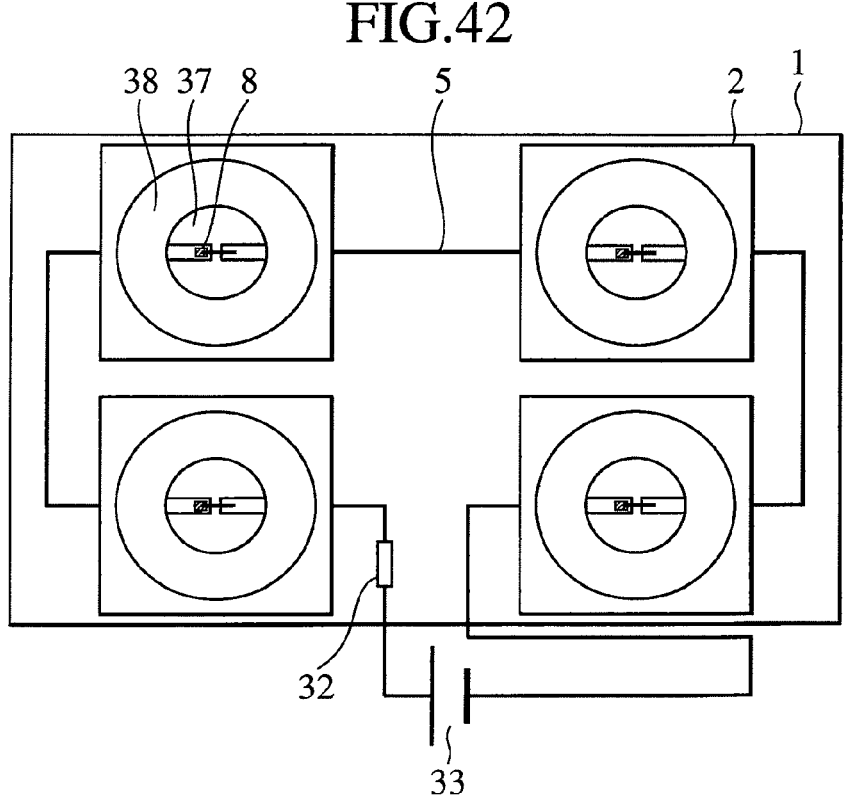
FIG. 42 is a top view of a wiring substrate unit implementing a zener diode and a constant-voltage power supply according to the present invention.
Figure 43:
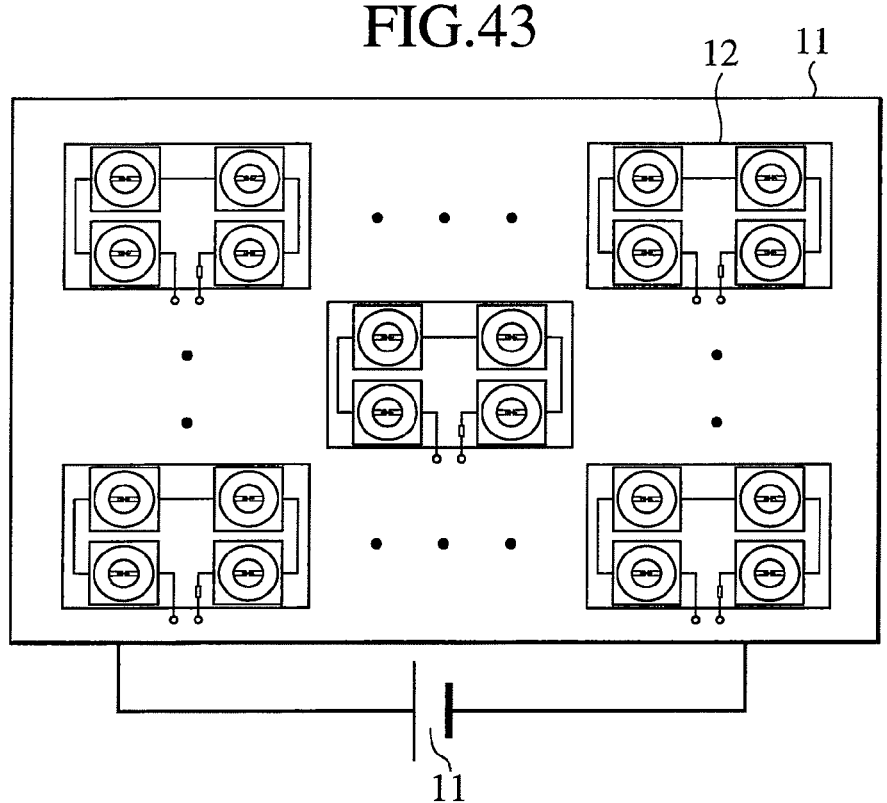
FIG. 43 is a top view showing the backlight configuration with planar-split area control, driven by a constant-voltage power supply, according to the present invention.
Figure 44:
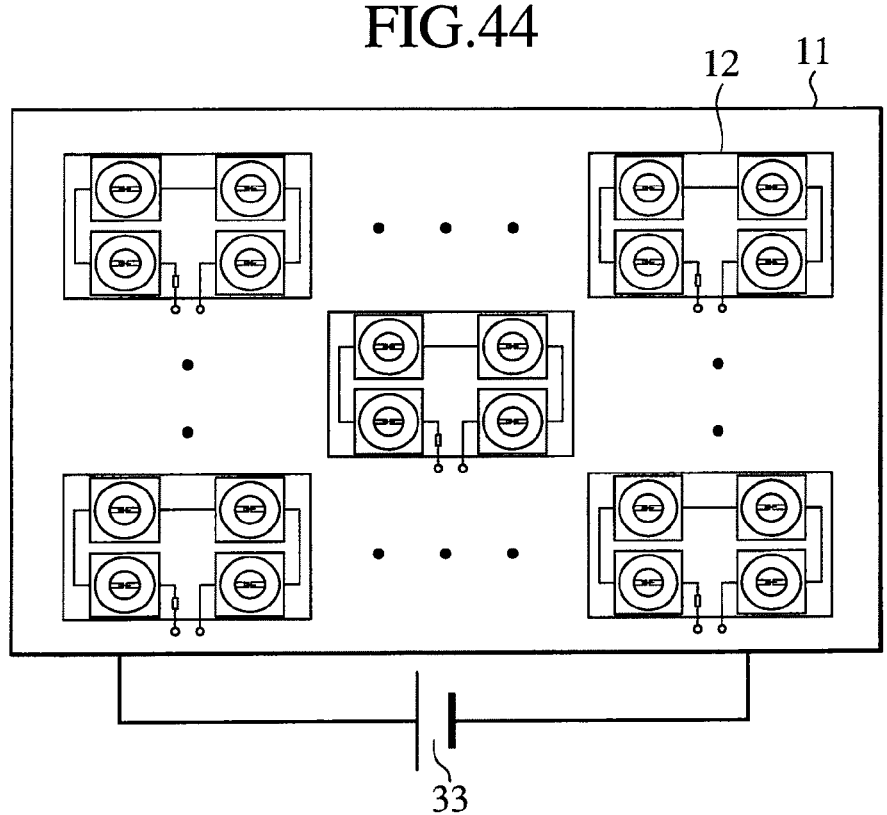
FIG. 44 is a top view showing the backlight configuration with planar-split area control, driven by a constant-voltage power supply, according to the present invention.

FIG. 41 shows a configuration in which the wiring resistance is provided to enable operation with a 12V constant-voltage power supply similar to the above-mentioned embodiment. Further, FIG. 41 shows a configuration in which a zener diode is provided to enable operation with a 24V constant-voltage power supply similar to the above-mentioned embodiment. FIG. 43 shows a stand for backlight module on which wiring substrate units with the wiring resistance are implemented, in which the wiring substrate units can be driven by a 12V power voltage. FIG. 44 shows a stand for backlight module on which wiring substrate units with the zener diode are implemented, in which the wiring substrate units can be driven by a 24V power voltage.

Figure 45:
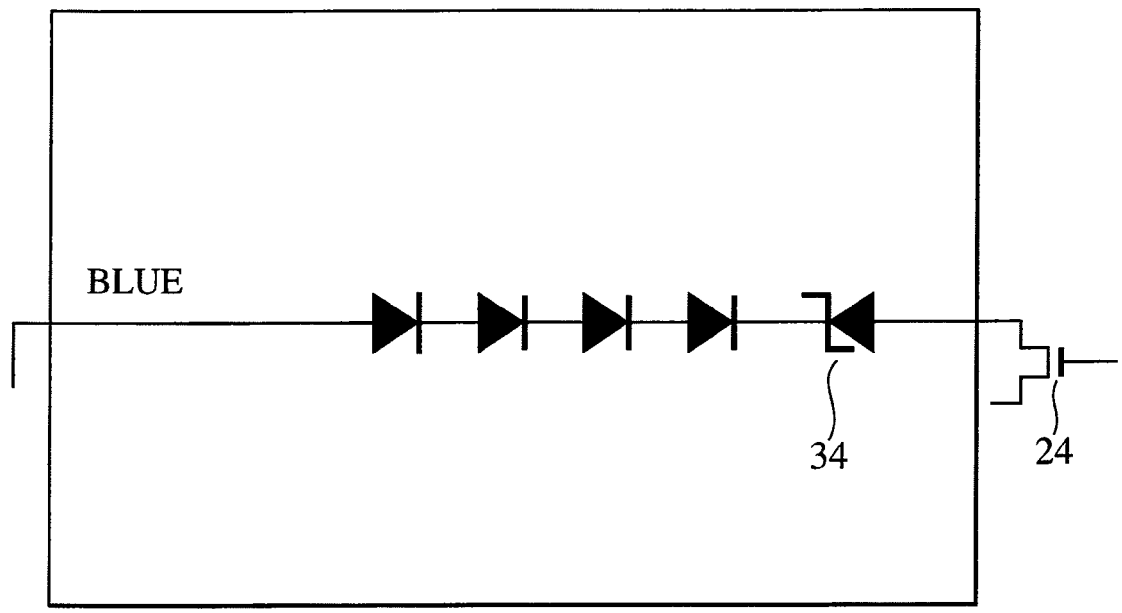
FIG. 45 is a top view showing the circuit configuration mounted on a wiring substrate unit according to the present invention.
Figure 46:
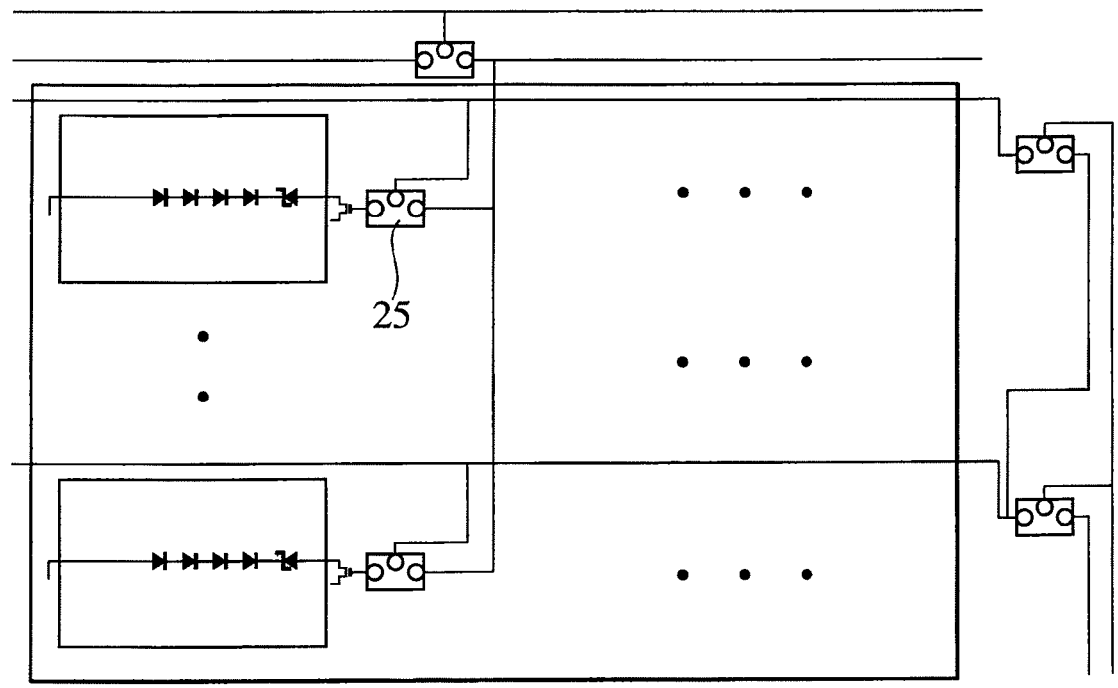
FIG. 46 is a top view showing the circuit configuration with planar-split area control, driven by a constant-voltage power supply, according to the present invention.

FIGS. 45 and 46, showing a case where a zener diode is provided, respectively demonstrate that the circuit configuration of a wiring substrate unit and the circuit configuration of a stand for backlight module can be manufactured.

Figure 47:
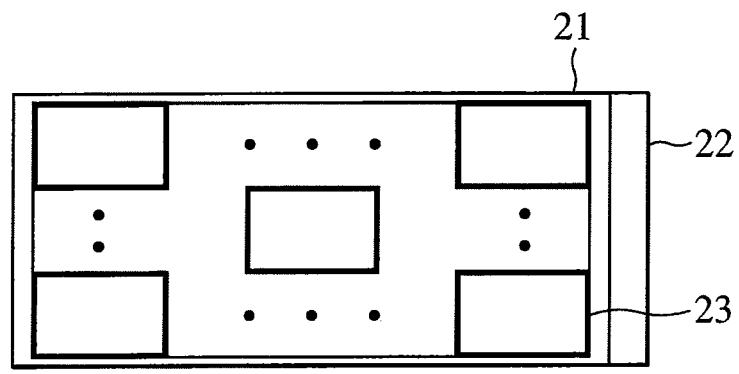
FIG. 47 is a top view showing the circuit configuration with planar-split area control, driven by a constant-voltage power supply, according to the present invention.

FIG. 47 shows a large scale sized liquid crystal display device including wiring substrate units having a white LED device mounted thereon. This configuration, which includes a stand for backlight 21, a driver circuit 22, and a large scale sized liquid crystal display panel 23, is applicable to a large scale sized liquid crystal display television.

Figure 48:
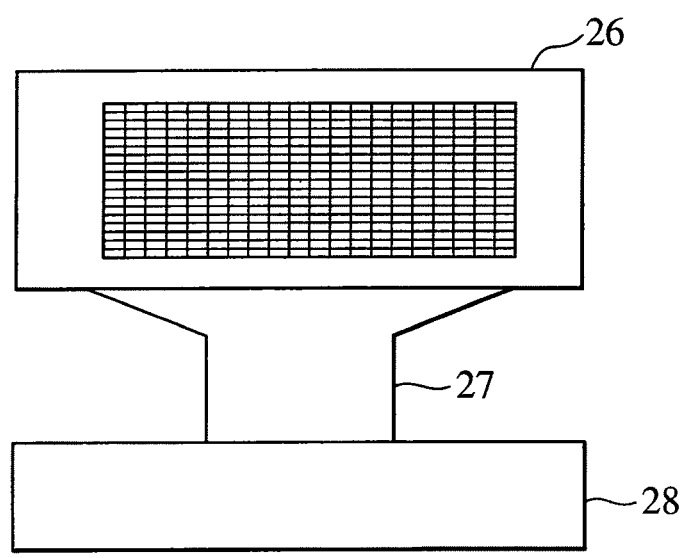
FIG. 48 is a top view of a large scale sized liquid crystal display panel display device using the backlight module mounting an infrared LED device according to the present invention.

FIG. 48 shows the configuration of a small or middle scale sized liquid crystal display panel 26 including a backlight module mounting a white LED device and an optical system, a circuit wiring 27, and a driver circuit 28. This configuration is applicable to an illumination device which uses the light source module according to the present embodiment as a backlight, thereby making it possible to provide small and middle scale sized liquid crystal display devices that can be driven by a constant power voltage.

In accordance with the present embodiment, it is possible to attain a configuration which allows a white LED device to be driven with a single power supply and each wiring substrate unit to be driven with a 12V or 24V constant-voltage power supply built-in a liquid crystal display device. Not limited to large scale sized and small and middle scale sized liquid crystal display devices, it is possible to enable split-image control and power control for each scene by selectively mounting each wiring substrate unit and driving it with a constant power voltage for planar-split area control. In a backlight module, the uniformity of luminance and chromaticity distributions required as a white light source can be ensured by appropriate optical arrangement of each wiring substrate unit. The configuration of LED devices and the configuration of the wiring substrate unit according to the present embodiment are applicable not only to a light source module for illumination devices but also to a backlight source for liquid crystal panel display devices for television, liquid crystal display panels for personal computers, or car navigation systems.

The contents of the present invention are applicable to a backlight module and a backlight source for illumination devices having a high-luminance white light source, liquid crystal display devices for large scale sized liquid crystal display televisions, and small and middle scale sized liquid crystal display devices for cellular phones, personal computers, etc.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An illumination device including a plurality of light source modules, being connected in parallel and driven by a single power voltage, each of the plurality of light source modules comprising:
   a substrate;
   at least four red LED devices provided on the substrate;
   at least four green LED devices provided on the substrate;
   at least four blue LED devices provided on the substrate;
   three wiring lines being connected in parallel, including a wiring line having the at least four red LED devices implemented in series; a wiring line having the at least four green LED devices implemented in series; and a wiring line having the at least four blue LED devices implemented in series;
   at least one zener diode having an operating voltage which varies in accordance with temperature, being provided respectively in at least one of the three wiring lines so as to compensate a voltage variation with temperature of the LED devices provided respectively in the at least one of the three wiring lines under a condition of constant luminance and constant light intensity; and
   a power supply circuit for driving both of (a) a control signal timing controller circuit mounted on a liquid crystal display device and (b) the plurality of light source modules connected in parallel according to the single power voltage, the power supply circuit being built in the liquid crystal display device.

2. The illumination device according to claim 1, wherein:
   the LED devices provided in each of the plurality of light source modules include n(R) red LED devices, n(G) green LED devices, and n(B) blue LED devices;
   the red LED devices, the green LED devices, and the blue LED devices operate on voltages V(R), V(G), and V(B), respectively; and
   a relation of $n(R) \geqq n(G) = n(B)$ or $n(R) \times V(R) = n(G) \times V(G) = n(B) \times V(B)$ is satisfied.

3. The illumination device according to claim 1, wherein:
   the plurality of LED devices provided in the light source module are implemented with a number ratio of 3:2:2 for red LED devices: green LED devices: blue LED devices.

4. The illumination device according to claim 1, wherein: the single power voltage has a value of 6 mV (m is an integer).

5. The illumination device according to claim 4, wherein:
   each of the plurality of light source modules is composed of six red LED devices, four green LED devices, and four blue LED devices; and
   each of the plurality of light source modules operates on a 12V power voltage.

6. A liquid crystal display device including the illumination device according to claim 4, and a liquid crystal display panel which receives light from the illumination device, wherein:
   the plurality of light source modules are driven by the same voltage as a 12V power voltage for a timing controller circuit supplied from a power supply mounted on the liquid crystal display panel; and
   each of the plurality of light source modules independently performs luminance control.

7. The liquid crystal display device according to claim 6, further comprising a driver circuit which drives the LED devices, wherein the timing controller circuit is utilized together with the driving circuit for control of the LED devices.

8. The illumination device according to claim 1, wherein:
   each of the plurality of light source modules is composed of 12 red LED devices, eight green LED devices, and eight blue LED devices; and
   each of the plurality of light source modules operates on a 24V power voltage.

9. A liquid crystal display device including the illumination device according to claim 8 and a liquid crystal display panel which receives light from the illumination device, wherein:
   the plurality of light source modules are driven by a 24V power supply for AC-DC conversion mounted on the liquid crystal display panel.

10. The liquid crystal display device according to claim 9, wherein:
    each of the plurality of light source modules independently performs luminance control.

11. The illumination device according to claim 1, wherein:
    any of the plurality of red LED devices, the plurality of green LED devices, or the plurality of blue LED devices include two or more types of LED devices having different wavelengths.

12. The illumination device according to claim 11, wherein:
    the plurality of red LED devices include two types of LED devices having different luminescence wavelengths for a light source and infrared communication.

13. The illumination device according to claim 1, wherein:
    each of the three wiring lines has a device resistor so as to enable to be driven by the single power voltage at a predetermined temperature.

14. The illumination device according to claim 13, wherein:
    each of the three wiring lines has the device resistor with a laser processed cut therein so as to adjust a resistance thereof.

15. The illumination device according to claim 1, wherein:
    the at least one zener diode has the operating voltage which varies with a positive temperature coefficient so as to compensate the voltage variation with temperature of the LED devices having a negative temperature coefficient.

16. The illumination device according to claim 15, wherein:
    one of a number of the at least four green LED devices and a number of the at least four blue LED devices in each of the plurality of light source modules is four;

the at least one zener diode includes one zener diode provided in one of the wiring lines of the green LED devices and the blue LED devices; and the power voltage has a value of 24 V.

17. The illumination device according to claim 1, wherein: the single power voltage has a value of 12 V or 24 V.

18. The illumination device according to claim 17, wherein:

a number of the at least four red LED devices in each of the plurality of light source modules is four;

the at least one zener diode is one zener diode provided in the wiring line of the red LED devices; and the power voltage has a value of 12 V.

19. A liquid crystal display device comprising:

a liquid crystal display panel including a pair of transparent substrate and a liquid crystal layer arranged between the pair of transparent substrate; and an illumination device includes a plurality of light source modules, being connected in parallel and driven by a single power voltage, each of the plurality of light source modules comprising:

a substrate;

at least four red LED devices provided on the substrate;

at least four green LED devices provided on the substrate;

at least four blue LED devices provided on the substrate;

three wiring lines being connected in parallel, including a wiring line having the at least four red LED devices implemented in series; a wiring line having at least four green LED devices implemented in series; and a wiring line having the at least four blue LED devices implemented in series;

at least one zener diode having an operating voltage which varies in accordance with temperature, being provided respectively in at least one of the three wiring lines so as to compensate a voltage variation with temperature of the LED devices provided respectively in the at least one of the three wiring lines under a condition of constant luminance and constant light intensity; and a power supply circuit for driving both of (a) a control signal timing controller circuit mounted on the liquid crystal display device and (b) the plurality of light source modules connected in parallel according to the single power voltage, the power supply circuit being built in the liquid crystal display device.

20. The liquid crystal display device according to claim 19, wherein:

each of the plurality of light source modules independently performs luminance control.

* * * * *